US012686990B2

(12) United States Patent
Iitani et al.

(10) Patent No.: US 12,686,990 B2
(45) Date of Patent: Jul. 21, 2026

(54) ELECTRIC CYLINDER AND WORK MACHINE

(71) Applicant: Komatsu Ltd., Tokyo (JP)

(72) Inventors: Hideshi Iitani, Tokyo (JP); Shouta Akazaki, Tokyo (JP)

(73) Assignee: KOMATSU LTD., Tokyo (JP)

( * ) Notice: Subject to any disclaimer, the term of this patent is extended or adjusted under 35 U.S.C. 154(b) by 259 days.

(21) Appl. No.: 18/289,905

(22) PCT Filed: May 9, 2022

(86) PCT No.: PCT/JP2022/019652
§ 371 (c)(1),
(2) Date: Nov. 8, 2023

(87) PCT Pub. No.: WO2022/239730
PCT Pub. Date: Nov. 17, 2022

(65) Prior Publication Data
US 2024/0240429 A1 Jul. 18, 2024

(30) Foreign Application Priority Data

May 10, 2021 (JP) ................................. 2021-079547

(51) Int. Cl.
| *E02F 3/42* | (2006.01) |
| *F16H 25/20* | (2006.01) |
| *F16H 25/24* | (2006.01) |
| *E02F 3/32* | (2006.01) |

(52) U.S. Cl.
CPC ............. *E02F 3/425* (2013.01); *F16H 25/20* (2013.01); *F16H 25/24* (2013.01); *E02F 3/32* (2013.01); *F16H 2025/2081* (2013.01)

(58) Field of Classification Search
CPC .. E02F 3/32; E02F 3/425; F16H 25/20; F16H 25/24; F16H 2025/2081
See application file for complete search history.

(56) References Cited

U.S. PATENT DOCUMENTS

| 12,180,672 B2 * | 12/2024 | Durkin | ..................... B60K 1/00 |
| 12,247,371 B2 * | 3/2025 | Durkin | ..................... E02F 3/38 |
| 2009/0260463 A1 | 10/2009 | Fukano et al. | |

(Continued)

FOREIGN PATENT DOCUMENTS

| DE | 102013214733 A1 * | 1/2015 | ............. F16C 11/02 |
| JP | H03-004962 U | 1/1991 | |

(Continued)

*Primary Examiner* — Saul Rodriguez
*Assistant Examiner* — Brendan P Tighe
(74) *Attorney, Agent, or Firm* — Troutman Pepper Locke LLP; James E. Armstrong, IV; Gabrielle L. Gelozin

(57) ABSTRACT

An electric cylinder includes a shaft, a bearing that is provided in an outer circumference of the shaft, and a holder that surrounds the shaft with the bearing therebetween. The holder includes a holder main body opening in an axial direction of the shaft and supporting the shaft with the bearing therebetween, and a trunnion portion having a cylindrical shape protruding outward in a manner of intersecting the axial direction from the holder main body. The holder is constituted so as to allow a lubricant to circulate therein from a side outward in the axial direction of the holder main body toward an inner circumference of the trunnion portion.

12 Claims, 15 Drawing Sheets

(56)     References Cited

U.S. PATENT DOCUMENTS

2017/0335541  A1*   11/2017  Caillieret ................. E02F 3/32
2018/0031092  A1*    2/2018  Daniel .................... F16H 57/04
2021/0381193  A1*   12/2021  Ishikawa ................ E02F 3/325

FOREIGN PATENT DOCUMENTS

JP          H04-347099  A     12/1992
JP          2004-080862  A      3/2004
JP          2005-172035  A      6/2005
JP          2008-039129  A      2/2008
JP          2009-275914  A     11/2009
JP          2017-020599  A      1/2017
JP          2017-048574  A      3/2017
JP          2020-204172  A     12/2020

* cited by examiner

UPWARD

FORWARD ← → REARWARD

DOWNWARD

ELECTRIC CYLINDER AND WORK MACHINE

TECHNICAL FIELD

The present invention relates to an electric cylinder and a work machine.

Priority is claimed on Japanese Patent Application No. 2021-079547, filed May 10, 2021, the content of which is incorporated herein by reference.

BACKGROUND ART

Patent Document 1 discloses an electric excavator as an example of a work machine. The electric excavator includes a vehicle main body, a boom that is provided turnably with respect to the vehicle main body, and an electric cylinder. The boom is driven by the electric cylinder.

Patent Document 2 discloses, as an electric cylinder, a constitution including an inner cylinder that stores a screw shaft extending in a vertical direction, and an outer cylinder that stores the inner cylinder in a retractable manner. The inner cylinder is fixed to a nut screwed to the screw shaft. A lubricant circulating inside the outer cylinder through a circulation hole is enclosed in a lower half portion inside the inner cylinder. An air chamber having an atmosphere communication hole formed in an upper end portion of the inner cylinder is formed in an upper half portion inside the inner cylinder.

Patent Document 3 discloses a constitution including a body that is elongated in an axial direction, and a displacement mechanism that is provided inside the body. The displacement mechanism includes a screw shaft accommodated inside the body, a displacement nut screwed to the screw shaft, a piston mounted on an outer circumferential side of the displacement nut, and a piston rod joined to the piston. One end portion of the screw shaft is joined to a connector. The connector is supported by a bearing in a rotatable manner. The second end portion of the screw shaft is joined to a holder. A support ring is provided on an outer circumferential surface of the holder. An outer circumferential surface of the support ring is formed to have a plurality of support portions in an uneven shape. The support portions come into sliding contact with an inner circumferential surface of the piston rod and support the piston rod in the axial direction in a displaceable manner. A stirring groove for guiding a lubricant is formed on the outer circumferential surface of the support ring.

RELATED ART DOCUMENT

Patent Document

[Patent Document 1]
   Japanese Unexamined Patent Application, First Publication No. 2020-204172
[Patent Document 2]
   Japanese Examined Utility Model Application, Second Publication No. H3-4962
[Patent Document 3]
   Japanese Unexamined Patent Application, First Publication No. 2009-275914

SUMMARY

Problems to be Solved by the Invention

In the case of Patent Document 1, the boom turns in response to driving of the electric cylinder. The electric cylinder has a connection hole through which a pin is inserted. The boom has a penetration hole through which the pin is inserted. The boom is supported turnably around a central axis of the pin by the pin inserted through the penetration hole of the boom and the connection hole of the electric cylinder. In Patent Document 1, in order to smoothly turn the boom, it is required to efficiently lubricate a connection portion of the electric cylinder.

In the case of Patent Document 2, a lubricant is enclosed inside the inner cylinder and inside the outer cylinder.

In the case of Patent Document 3, a lubricant is stirred by the stirring groove of the support ring.

In Patent Document 2 and Patent Document 3, when the electric cylinder is turnably connected to a target member such as a pin, there is room for improvement in efficiently lubricating a connection portion of the electric cylinder.

Hence, an object of the present invention is to provide an electric cylinder and a work machine in which a connection portion of the electric cylinder can be efficiently lubricated.

Means for Solving the Problem

An electric cylinder according to an aspect of the present invention includes a shaft, a bearing that is provided in an outer circumference of the shaft, and a holder that surrounds the shaft with the bearing therebetween. The holder includes a holder main body opening in an axial direction of the shaft and supporting the shaft with the bearing therebetween, and a trunnion portion having a cylindrical shape protruding outward in a manner of intersecting the axial direction from the holder main body. The holder is constituted so as to allow a lubricant to circulate therein from a side outward in the axial direction of the holder main body toward an inner circumference of the trunnion portion.

Advantage of the Invention

According to the foregoing aspect, a connection portion of an electric cylinder can be efficiently lubricated.

BRIEF DESCRIPTION OF THE DRAWINGS

FIG. 10 is a view corresponding to an enlarged view of X part in FIG. 8 and is a view illustrating a head side space and a bottom side space in a state in which a nut according to the embodiment is separated from a holder.

FIG. 17 is a view corresponding to FIG. 10 and is an explanatory view of an example of a flow of a lubricant according to the embodiment.

DESCRIPTION OF THE EMBODIMENTS

Hereinafter, an embodiment of the present invention will be described with reference to the drawings. In the embodiment, an excavator will be described as an example of a work machine (work vehicle).

<Excavator (Work Machine)>

Figure 1:
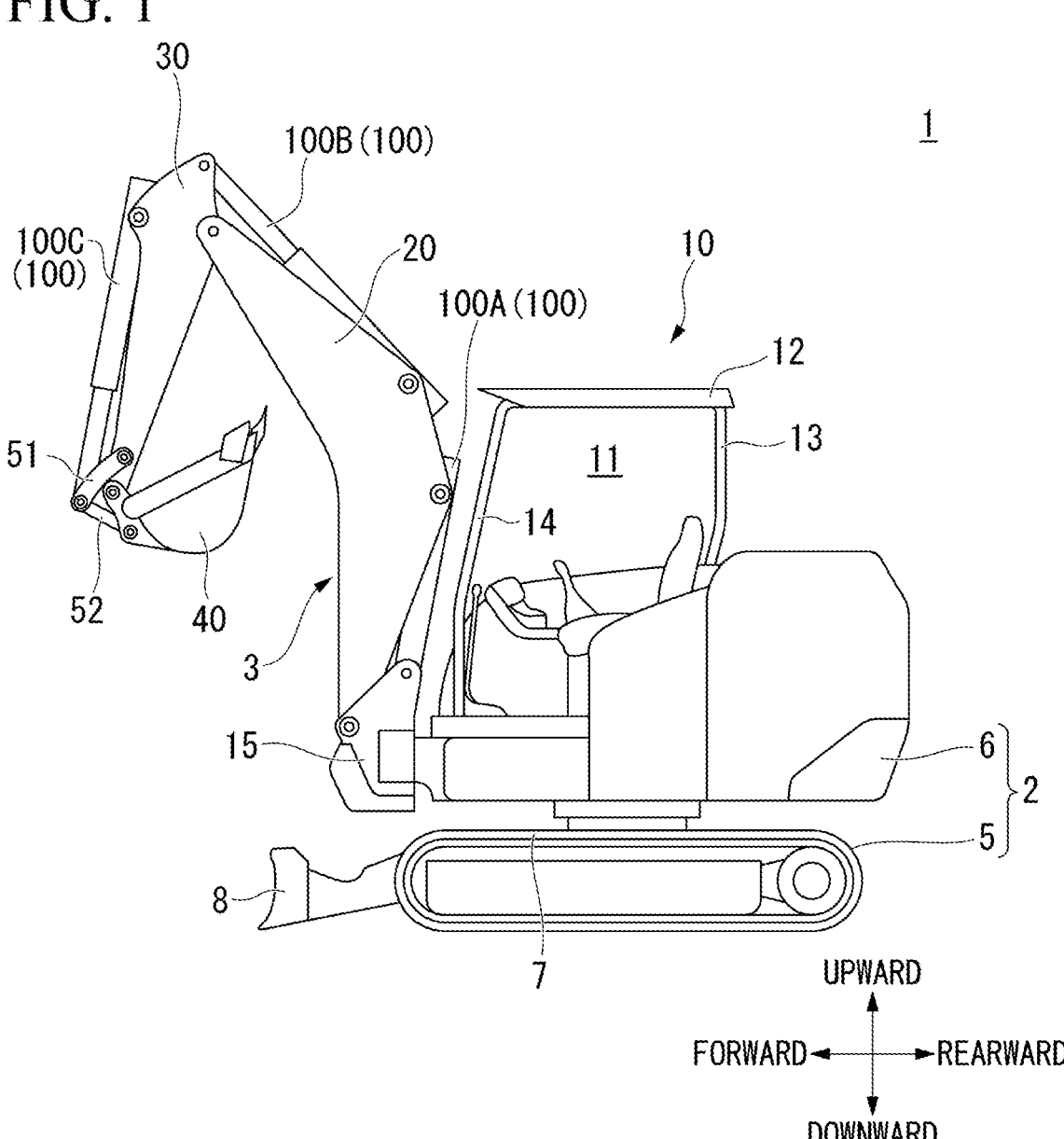
FIG. 1 is a side view of an excavator according to an embodiment.

As illustrated in FIG. 1, an excavator 1 serving as a work machine includes a vehicle main body 2 and a work apparatus 3 joined to the vehicle main body 2. Hereinafter, a forward movement direction, a rearward movement direction, and a vehicle width direction of the excavator 1 will be referred to as "a forward direction of the vehicle (toward one side in a forward-rearward direction of the vehicle)", "a rearward direction of the vehicle (toward the other side in the forward-rearward direction of the vehicle)", and "the vehicle width direction", respectively. The vehicle width direction may also be referred to using "the left side (one side in the vehicle width direction)" or "the right side (the other side in the vehicle width direction)". A right-hand side with respect to the direction in which the excavator 1 moves forward will be referred to as the right side, and a left-hand side with respect to the direction in which the excavator 1 moves forward will be referred to as the left side. A vertical direction, upward, and downward in a state in which the excavator 1 is disposed on a horizontal surface will be simply referred to as "a vertical direction", "upward" and "downward", respectively.

<Vehicle Main Body>

The vehicle main body 2 includes a self-propelled lower traveling body 5, and an upper swing body 6 which is provided on the lower traveling body 5 in a swingable manner.

The lower traveling body 5 has a pair of left and right crawler belts 7. The lower traveling body 5 is provided with an electric motor (not illustrated) for driving the crawler belts 7. The lower traveling body 5 travels when the crawler belts 7 are driven by the electric motor. The lower traveling body 5 may be provided with a hydraulic motor in place of an electric motor.

A blade 8 serving as an earth-moving plate extending in the vehicle width direction of the lower traveling body 5 is provided in a front portion of the lower traveling body 5. The lower traveling body 5 includes an electric actuator (not illustrated) for driving the blade 8. A height position of the blade 8 can be adjusted by driving the electric actuator.

The upper swing body 6 is provided in an upper portion of the lower traveling body 5. An electric motor for traveling that is a driving source for the lower traveling body 5, a motor of an electric cylinder that is a driving source for the work apparatus 3, a battery serving as a power source for each of the motors, an inverter and the like (not illustrated) are provided in the upper swing body 6. The upper swing body 6 can swing around an axis extending in the vertical direction with respect to the lower traveling body 5.

A canopy 10 is provided in the upper swing body 6. The canopy 10 has an operation space 11 which can accommodate an operator. The canopy 10 includes a hood 12 forming a ceiling portion of the operation space 11, rear struts 13 provided on both sides of a rear portion of the hood 12 in the vehicle width direction and extending downward from the hood 12, and front portion struts 14 provided on both sides of a front portion of the hood 12 in the vehicle width direction and extending downward from the hood 12.

Figure 2:
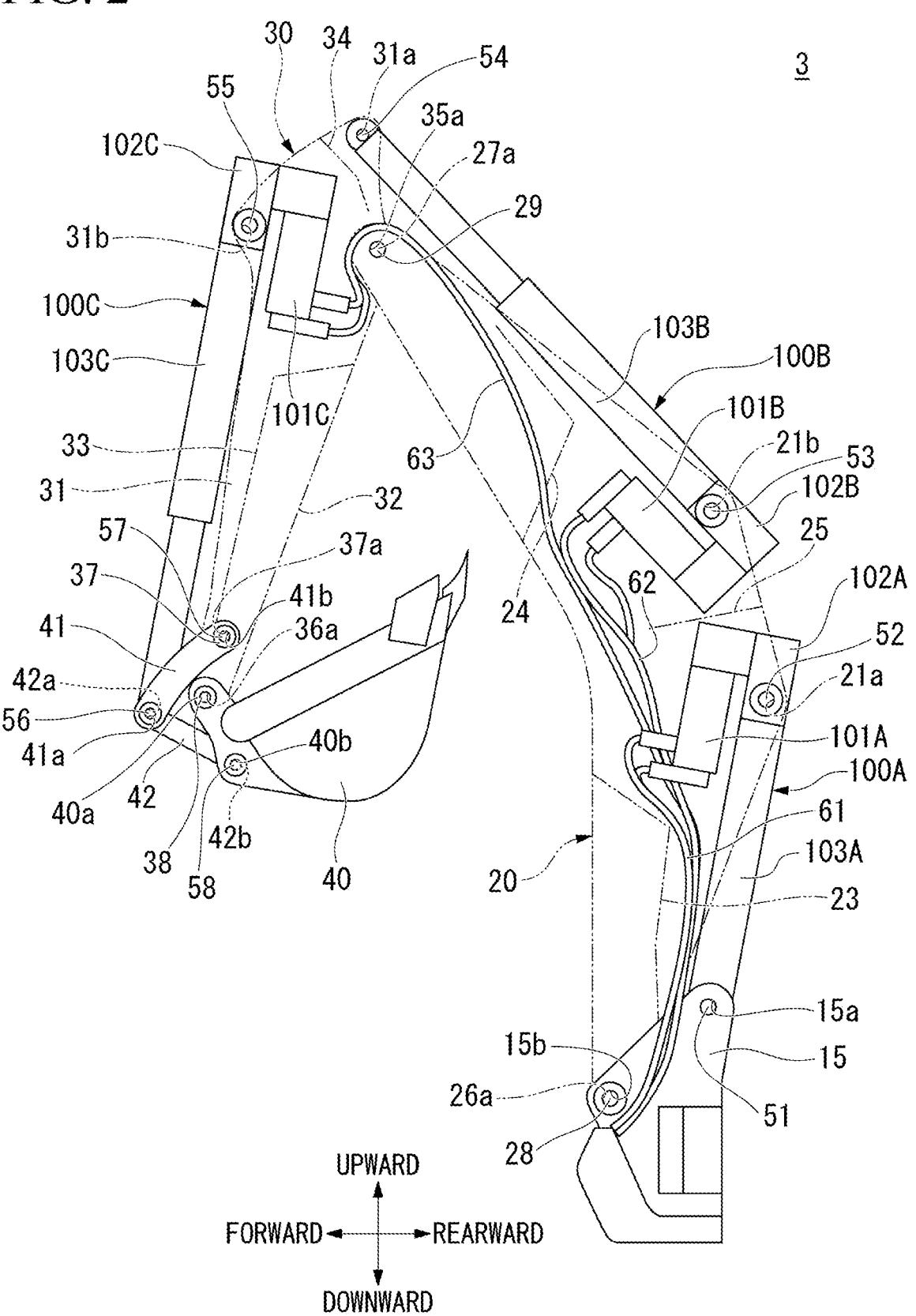
FIG. 2 is a side view of a work apparatus according to the embodiment and is a transparent view illustrating the inside of a boom and an arm.

A bracket 15 for supporting a boom 20 is provided in a front portion of the upper swing body 6. As illustrated in FIG. 2, the bracket 15 has a first hole 15a and a second hole 15b opening in the vehicle width direction of the upper swing body 6. The first hole 15a is disposed in the vicinity of an upper end portion of the bracket 15. The second hole 15b is disposed on a side downward and forward from the first hole 15a.

<Work Apparatus>

As illustrated in FIG. 1, the work apparatus 3 is provided such that it can be operated in a bendable and hoistable manner with respect to the upper swing body 6. The work apparatus 3 includes the boom 20, an arm 30, a bucket 40 (work tool), and a plurality of (for example, three In the present embodiment) electric cylinders 100A to 100C. The three electric cylinders 100A to 100C are constituted of a first electric cylinder 100A for operating the boom 20, a second electric cylinder 100B for operating the arm 30, and a third electric cylinder 100C for operating the bucket 40. A base end portion of the boom 20 is rotatably joined to the upper swing body 6. A distal end portion of the boom 20 is rotatably joined to a base end portion of the arm 30. A distal end portion of the arm 30 is rotatably joined to the bucket 40.

<Boom>

In the posture in FIG. 1, when viewed in the vehicle width direction of the upper swing body 6, the boom 20 extends upward from the bracket 15, bends, and then extends upward toward the front. Hereinafter, when viewed in the vehicle width direction of the upper swing body 6, a direction in which the boom 20 extends will be regarded as "a boom extending direction", and a direction orthogonal to the direction in which the boom extends will be regarded as "a boom plate width direction". One end portion of the boom 20 in the boom extending direction (an end portion on the bracket 15 side) will be regarded as "a boom base end portion". The second end portion of the boom 20 in the boom extending direction (an end portion on a side opposite to the boom base end portion) will be regarded as "a boom distal end portion". The dimension in the boom plate width direction gradually increases from the boom base end portion toward a part in the vicinity of the center in the boom extending direction and then gradually decreases toward the boom distal end portion.

Figure 3:
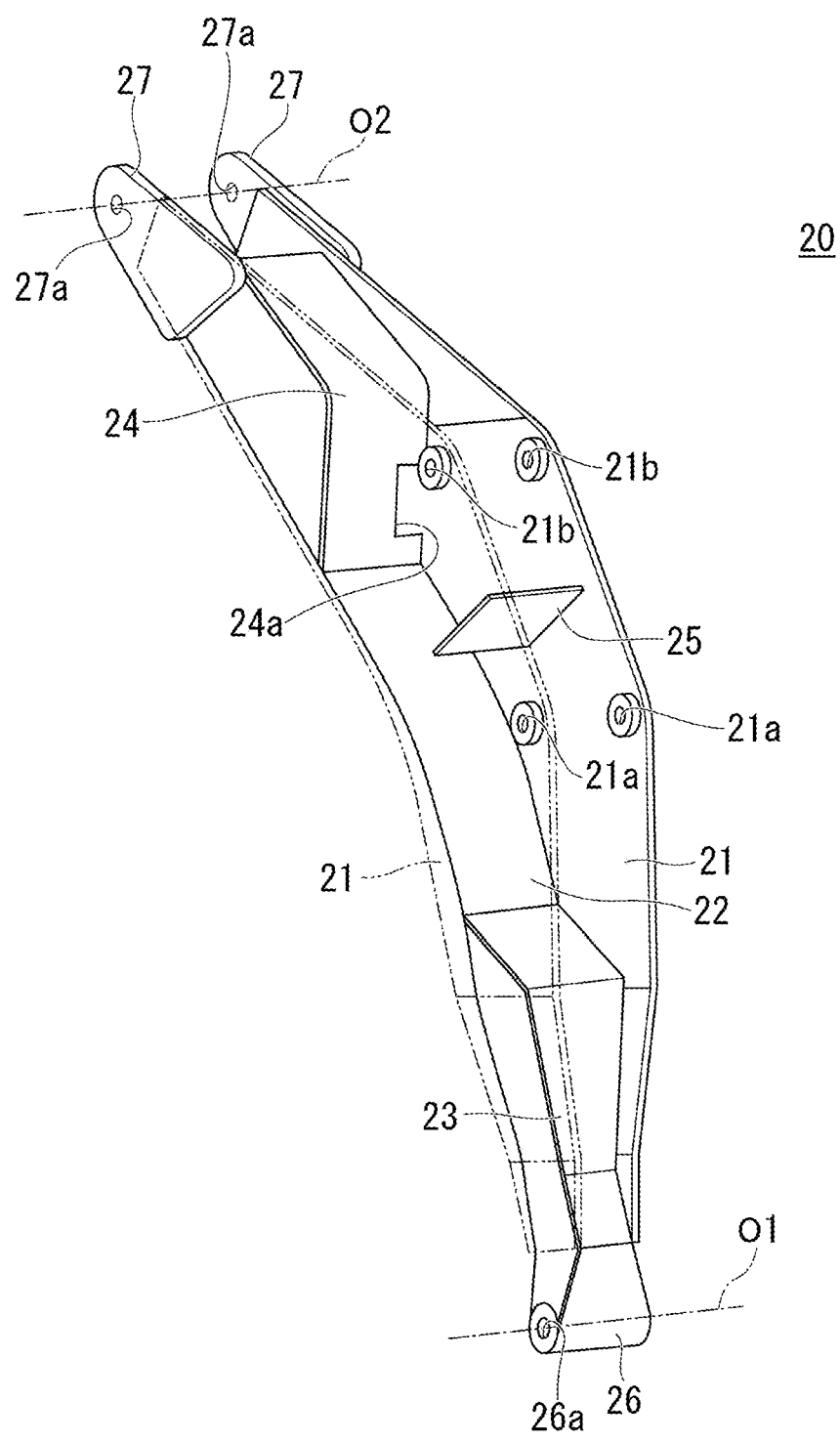
FIG. 3 is a perspective view of the boom according to the embodiment and is a transparent view illustrating the inside of the boom.

As illustrated in FIG. 3, the boom 20 includes a pair of boom side plates 21 disposed away from each other in the vehicle width direction of the upper swing body 6, a boom bottom plate 22 extending in the vehicle width direction of the upper swing body 6 and connecting the pair of boom side plates 21 to each other, a boom base end side connection plate 23 connected to the boom base end portion side of the boom bottom plate 22, a boom distal end side connection plate 24 connected to the boom distal end portion side of the boom bottom plate 22, a boom partitioning member 25 partitioning a space sandwiched between the pair of boom side plates 21 in the vicinity of the center in the boom extending direction, a boom base end support member 26 having the boom base end portion supported by the upper swing body 6, and arm support plates 27 supporting the arm 30.

Each of the boom side plates 21 has a first cylinder base end side hole 21a and a second cylinder base end side hole 21b opening in the vehicle width direction of the upper swing body 6. As illustrated in FIG. 2, when viewed in the vehicle width direction of the upper swing body 6, the first cylinder base end side hole 21a is disposed on a lower side in the vicinity of the center in the boom extending direction and in a part overlapping a portion of the first electric cylinder 100A (in the vicinity of the upper end portion in FIG. 2). When viewed in the vehicle width direction of the upper swing body 6, the second cylinder base end side hole 21b is disposed on an upper side in the vicinity of the center in the boom extending direction and in a part overlapping a portion of the second electric cylinder 100B (in the vicinity of the lower end portion in FIG. 2).

As illustrated in FIG. 3, the boom bottom plate 22 is provided at an edge portion on a side opposite to the upper swing body 6 in the boom plate width direction of the boom side plates 21. The boom bottom plate 22 extends in the boom extending direction. The boom bottom plate 22 is curved toward a part between the first cylinder base end side hole 21a and the second cylinder base end side hole 21b in the vicinity of the center in the boom extending direction.

The boom base end side connection plate 23 extends in the vehicle width direction of the upper swing body 6 on the boom base end portion side and connects the pair of boom side plates 21 to each other. The boom base end side connection plate 23 bends after extending in a manner of approaching the boom base end portion as it goes away from a connection portion with respect to the boom bottom plate 22 in the boom plate width direction and extends toward the boom base end portion.

The boom distal end side connection plate 24 extends in the vehicle width direction of the upper swing body 6 on the boom distal end portion side and connects the pair of boom side plates 21 to each other. The boom distal end side connection plate 24 bends after extending in a manner of approaching the boom distal end portion as it goes away from the connection portion with respect to the boom bottom plate 22 in the boom plate width direction and extends toward the boom distal end portion. The boom distal end side connection plate 24 has an opening portion 24a opening in the boom extending direction at a position adjacent to one boom side plate 21.

The boom partitioning member 25 extends in the vehicle width direction of the upper swing body 6 in the vicinity of the center in the boom extending direction and connects the pair of boom side plates 21 to each other. The boom partitioning member 25 extends in the boom plate width direction. The boom partitioning member 25 is disposed between the first cylinder base end side hole 21a and the second cylinder base end side hole 21b. The boom partitioning member 25 is separated from the boom bottom plate 22 in the boom plate width direction.

The boom base end support member 26 is provided on the boom base end portion side. The boom base end support member 26 has a first penetration hole 26a opening in the vehicle width direction of the upper swing body 6. A first pin 28 (refer to FIG. 2) extending in the vehicle width direction of the upper swing body 6 is inserted through the first penetration hole 26a. The boom 20 is supported turnably around a central axis O1 of the first pin 28 due to the first pin 28 inserted through the first penetration hole 26a of the boom base end support member 26 and the second hole 15b of the bracket 15.

The arm support plates 27 are provided on the boom distal end portion side. Arm support portions 16 are provided on outer surfaces of the boom side plates 21 in a manner of sandwiching the pair of boom side plates 21 from the outward side in the vehicle width direction of the upper swing body 6. The arm support plates 27 protrude outward in the boom extending direction beyond the boom side plates 21. Each of the arm support plates 27 has a second penetration hole 27a opening in the vehicle width direction of the upper swing body 6. The second penetration hole 27a is provided in a part protruding outward in the boom extending direction beyond the boom side plate 21 in the arm support plate 27. A second pin 29 (refer to FIG. 2) extending in the vehicle width direction of the upper swing body 6 is inserted through the second penetration holes 27a.

<Arm>

In the posture in FIG. 1, when viewed in the vehicle width direction of the upper swing body 6, the arm 30 extends downward toward the front from a part overlapping a portion of the second electric cylinder 100B (in the vicinity of the upper end portion in FIG. 1). Hereinafter, when viewed in the vehicle width direction of the upper swing body 6, a direction in which the arm 30 extends will be regarded as "an arm extending direction", and a direction orthogonal to the direction in which the arm extends will be regarded as "an arm plate width direction". One end portion of the arm 30 in the arm extending direction (an end portion on the second electric cylinder 100B side) will be regarded as "an arm base end portion". The second end portion of the arm 30 in the arm extending direction (an end portion on a side opposite to the arm base end portion) will be regarded as "an arm distal end portion". The dimension of the arm plate width direction gradually increases from the arm base end portion toward a part in the vicinity of a boom connection portion in the arm extending direction and then gradually decreases toward the arm distal end portion.

Figure 4:
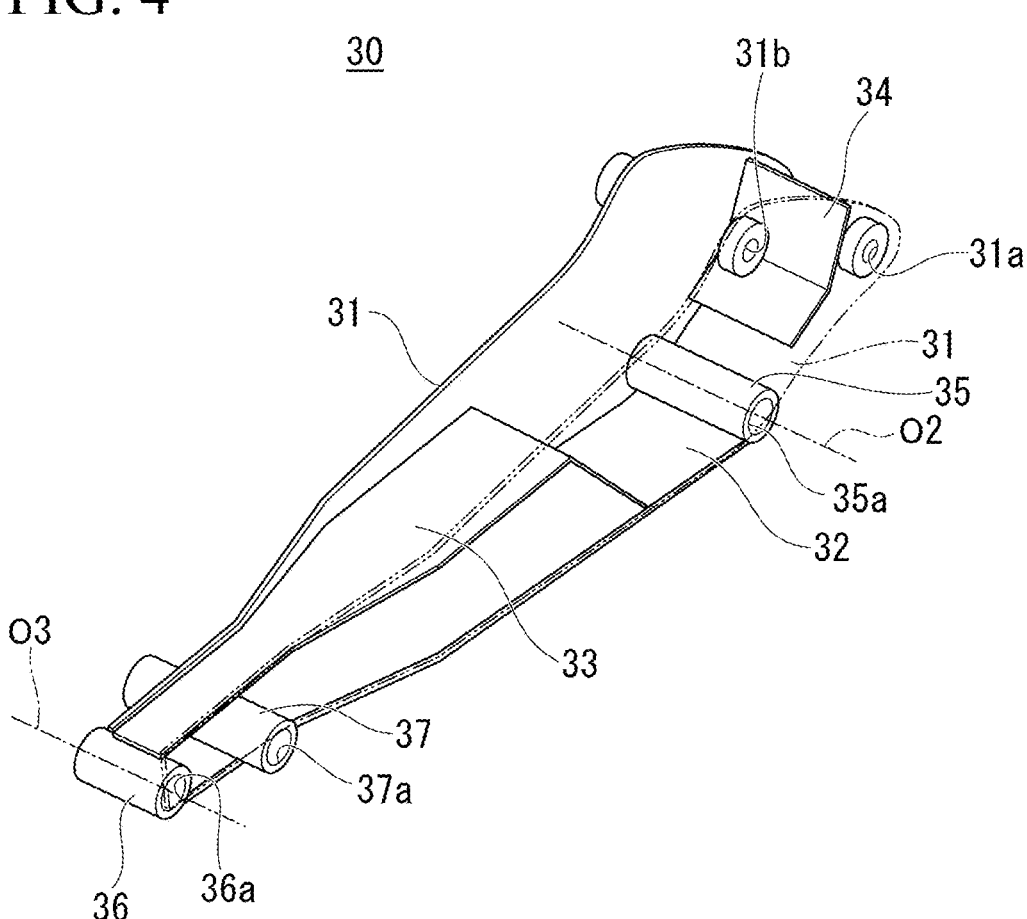
FIG. 4 is a perspective view of the arm according to the embodiment and is a transparent view illustrating the inside of the arm.

As illustrated in FIG. 4, the arm 30 includes a pair of arm side plates 31 disposed away from each other in the vehicle width direction of the upper swing body 6, an arm bottom plate 32 extending in the vehicle width direction of the upper swing body 6 and connecting the pair of arm side plates 31 to each other, an arm side connection plate 33 connected to the arm bottom plate 32, an arm partitioning member 34 partitioning a space sandwiched between the pair of arm side plates 31 in the vicinity of the arm base end portion, a boom distal end connection member 35 connected to the boom distal end portion, a bucket support member 36 supporting the bucket 40 (refer to FIG. 2), and a link support member 37 supporting a first end portion of a first link member 41 (refer to FIG. 2).

Each of the arm side plates 31 has a second cylinder distal end side hole 31a and a third cylinder base end side hole 31b opening in the vehicle width direction of the upper swing body 6. As illustrated in FIG. 2, when viewed in the vehicle width direction of the upper swing body 6, the second cylinder distal end side hole 31a is disposed in the vicinity of the arm base end portion and in a part overlapping a portion of the second electric cylinder 100B (in the vicinity of the upper end portion in FIG. 2). When viewed in the vehicle width direction of the upper swing body 6, the third cylinder base end side hole 31b is disposed on a side opposite to a part overlapping the boom distal end portion in the arm plate width direction and in a part overlapping a portion of the third electric cylinder 100C (in the vicinity of the upper end portion in FIG. 2).

In the posture in FIG. 2, the arm bottom plate 32 is provided in edge portions of the arm side plates 31 in the arm plate width direction on the upper swing body 6 side (boom 20 side). The arm bottom plate 32 extends in the arm extending direction. As illustrated in FIG. 4, the arm bottom plate 32 extends between the boom distal end connection member 35 and the bucket support member 36 in the arm extending direction.

The arm side connection plate 33 extends in the vehicle width direction of the upper swing body 6 on the arm distal end portion side and connects the pair of arm side plates 31 to each other. The arm side connection plate 33 bends after extending in a manner of approaching the arm distal end portion as it goes away from a connection portion with respect to the arm bottom plate 32 in the arm plate width direction and extends toward the arm distal end portion.

The arm partitioning member 34 extends in the vehicle width direction of the upper swing body 6 in the vicinity of the arm base end portion and connects the pair of arm side plates 31 to each other. The arm partitioning member 34 is disposed between the second cylinder distal end side hole 31a and the third cylinder base end side hole 31b. The arm partitioning member 34 is disposed away from the boom distal end connection member 35. When viewed in the vehicle width direction of the upper swing body 6, the arm partitioning member 34 bends after extending from a part in the vicinity of the boom distal end connection member 35 toward the arm distal end portion side and extends in a manner of traversing a part between the second cylinder distal end side hole 31a and the third cylinder base end side hole 31b.

The boom distal end connection member 35 is formed to have a cylindrical shape extending in the vehicle width direction of the upper swing body 6. The boom distal end connection member 35 has a boom connection hole 35a opening in the vehicle width direction of the upper swing body 6. As illustrated in FIG. 2, when viewed in the vehicle width direction of the upper swing body 6, the boom connection hole 35a overlaps the second penetration holes 27a of the arm support plates 27. The arm 30 is supported turnably around a central axis O2 of the second pin 29 (refer to FIG. 4) due to the second pin 29 inserted through the second penetration holes 27a of the arm support plates 27 and the boom connection hole 35a of the boom distal end connection member 35.

As illustrated in FIG. 4, the bucket support member 36 is provided in the arm distal end portion. The bucket support member 36 is formed to have a cylindrical shape extending in the vehicle width direction of the upper swing body 6. The bucket support member 36 has a third penetration hole 36a opening in the vehicle width direction of the upper swing body 6. A third pin 38 (refer to FIG. 2) extending in the vehicle width direction of the upper swing body 6 is inserted through the third penetration hole 36a.

As illustrated in FIG. 4, the link support member 37 is disposed between the arm bottom plate 32 and the arm side connection plate 33. The link support member 37 is disposed in the vicinity of the bucket support member 36. The link support member 37 is formed to have a cylindrical shape extending in the vehicle width direction of the upper swing body 6. The link support member 37 protrudes outward in the vehicle width direction of the upper swing body 6 beyond the pair of arm side plates 31. The link support member 37 has a first link connection hole 37a opening in the vehicle width direction of the upper swing body 6.

<Bucket>

In the posture in FIG. 2, the bucket 40 is inclined from the arm distal end portion toward a part in the vicinity of the center in the boom extending direction. The bucket 40 has a bucket connection hole 40a and a second link connection hole 40b opening in the vehicle width direction of the upper swing body 6.

When viewed in the vehicle width direction of the upper swing body 6, the bucket connection hole 40a overlaps the third penetration hole 36a of the bucket support member 36. The bucket 40 is supported turnably around a central axis O3 of the third pin 38 (refer to FIG. 4) due to the third pin 38 inserted through the third penetration hole 36a of the bucket support member 36 and the bucket connection hole 40a of the bucket 40.

In the posture in FIG. 2, the second link connection hole 40b is disposed at a position separated downward and rearward from the bucket connection hole 40a.

<First Electric Cylinder>

As illustrated in FIG. 2, the first electric cylinder 100A is disposed on the boom base end portion side of the boom partitioning member 25. The first electric cylinder 100A includes a first cylinder main body 103A constituted to be able to extend and retract in the boom extending direction, a first motor 101A serving as a driving source, and a first power transmission unit 102A transmitting a driving force of the first motor 101A to the first cylinder main body 103A.

The first cylinder main body 103A and the first motor 101A extend parallel to each other. A first end portion of the first cylinder main body 103A is connected to a pin 51 inserted through the first hole 15a of the bracket 15. The first electric cylinder 100A is supported by the upper swing body 6 via the bracket 15 so as to be able to turn around a central axis of the pin 51 extending in the width direction of the upper swing body 6.

A second end portion of the first cylinder main body 103A is connected to a pin 52 inserted through the first cylinder base end side hole 21a of the boom 20. The first electric cylinder 100A is supported by the boom 20 so as to be able to turn around a central axis of the pin 52 extending in the width direction of the upper swing body 6.

The first motor 101A is disposed on the second end portion side of the first cylinder main body 103A. The first motor 101A is disposed on the inward side of the first cylinder main body 103A in the boom plate width direction. The first motor 101A causes the first cylinder main body 103A to operate with a battery (not illustrated) provided in the upper swing body 6 serving as a power source. The boom 20 turns around the central axis O1 of the first pin 28 (refer to FIG. 3) with respect to the upper swing body 6 due to the first cylinder main body 103A extending and retracting in response to driving of the first motor 101A.

A first wiring 61 extends from the first motor 101A. The first wiring 61 extends along the boom base end side connection plate 23 and leads to the inside of the bracket 15. The first wiring 61 is connected to a battery (not illustrated) through the inside of the bracket 15.

<Second Electric Cylinder>

The second electric cylinder 100B is disposed on the boom distal end portion side of the boom partitioning member 25. The second electric cylinder 100B includes a second cylinder main body 103B constituted to be able to extend and retract in the boom extending direction, a second motor 101B serving as a driving source, and a second power transmission unit 102B transmitting a driving force of the second motor 101B to the second cylinder main body 103B.

The second cylinder main body 103B and the second motor 101B extend parallel to each other. A first end portion of the second cylinder main body 103B is connected to a pin 53 inserted through the second cylinder base end side hole 21b of the boom 20. The second electric cylinder 100B is supported by the boom 20 so as to be able to turn around a central axis of the pin 53 extending in the width direction of the upper swing body 6 with respect to the boom 20.

A second end portion of the second cylinder main body 103B is connected to a pin 54 inserted through the second cylinder distal end side hole 31a of the arm 30. The second electric cylinder 100B is supported by the arm 30 so as to be able to turn around a central axis of the pin 54 extending in the width direction of the upper swing body 6 with respect to the arm 30.

The second motor 101B is disposed on the first end portion side of the second cylinder main body 103B. The second motor 101B is disposed on the inward side of the second cylinder main body 103B in the boom plate width direction. The second motor 101B causes the second cylinder main body 103B to operate with a battery (not illustrated) provided in the upper swing body 6 serving as a power source. The arm 30 turns around the central axis O2 of the second pin 29 (refer to FIG. 3) with respect to the boom 20 due to the second cylinder main body 103B extending and retracting in response to driving of the second motor 101B.

A second wiring 62 extends from the second motor 101B. The second wiring 62 extends toward the first motor 101A and then extends along the boom base end side connection plate 23 together with the first wiring 61, thereby leading to the inside of the bracket 15. The second wiring 62 is connected to a battery (not illustrated) through the inside of the bracket 15.

<Third Electric Cylinder>

The third electric cylinder 100C is disposed on the arm distal end portion side of the arm partitioning member 34. The third electric cylinder 100C includes a third cylinder main body 103C constituted to be able to extend and retract in the arm extending direction, a third motor 101C serving as a driving source, and a third power transmission unit 102C transmitting a driving force of the third motor 101C to the third cylinder main body 103C.

The third cylinder main body 103C and the third motor 101C extend parallel to each other. A first end portion of the third cylinder main body 103C is connected to a pin 55 inserted through the third cylinder base end side hole 31b of the arm 30. The third electric cylinder 100C is supported by the arm 30 so as to be able to turn around a central axis of the pin 55 extending in the width direction of the upper swing body 6 with respect to the arm 30.

A second end portion of the third cylinder main body 103C is connected to a first end portion of the first link member 41. The first end portion of the first link member 41 has a first link hole 41a opening in the width direction of the upper swing body 6. The second end portion of the third cylinder main body 103C is connected to a pin 56 inserted through the first link hole 41a. The third electric cylinder 100C supports the first link member 41 so as to be able to turn around a central axis of the pin 56 extending in the width direction of the upper swing body 6 with respect to the first link member 41.

A second end portion of the first link member 41 has a second link hole 41b opening in the width direction of the upper swing body 6. A pin 57 is inserted through the second link hole 41b together with the first link connection hole 37a of the arm 30. The first link member 41 is supported by the arm 30 so as to be able to turn around a central axis of the pin 57 extending in the width direction of the upper swing body 6 with respect to the arm 30.

The second end portion of the third cylinder main body 103C is connected to a first end portion of a second link member 42. The first end portion of the second link member 42 has a third link hole 42a opening in the width direction of the upper swing body 6. The second end portion of the third cylinder main body 103C is connected to the pin 56 inserted through the third link hole 42a together with the first link hole 41a. The second link member 42 is provided turnably around the central axis of the pin 56 extending in the width direction of the upper swing body 6 with respect to the second end portion of the third cylinder main body 103C and the first end portion of the first link member 41.

A second end portion of the second link member 42 has a fourth link hole 42b penetrating it in the width direction of the upper swing body 6. A pin 58 is inserted through the fourth link hole 42b together with the second link connection hole 40b of the bucket 40. The second link member 42 is provided turnably around a central axis of the pin 58 extending in the width direction of the upper swing body 6 with respect to the bucket 40.

The third motor 101C is disposed on the first end portion side of the third cylinder main body 103C. The third motor 101C is disposed on the inward side of the third cylinder main body 103C in the arm plate width direction. The third motor 101C causes the third cylinder main body 103C to operate with a battery (not illustrated) provided in the upper swing body 6 serving as a power source. The bucket 40 turns around the central axis O3 of the third pin 38 (refer to FIG. 4) with respect to the arm 30 due to the third cylinder main body 103C extending and retracting in response to driving of the third motor 101C.

A third wiring 63 extends from the third motor 101C. The third wiring 63 extends toward the boom 20 and then passes through the opening portion 24a of the boom distal end side connection plate 24 (refer to FIG. 3). Thereafter, the third wiring 63 extends toward the first motor 101A and then extends along the boom base end side connection plate 23 together with the first wiring 61 and the second wiring 62, thereby leading to the inside of the bracket 15. The third wiring 63 is connected to a battery (not illustrated) through the inside of the bracket 15.

<Electric Cylinder>

Figure 5:
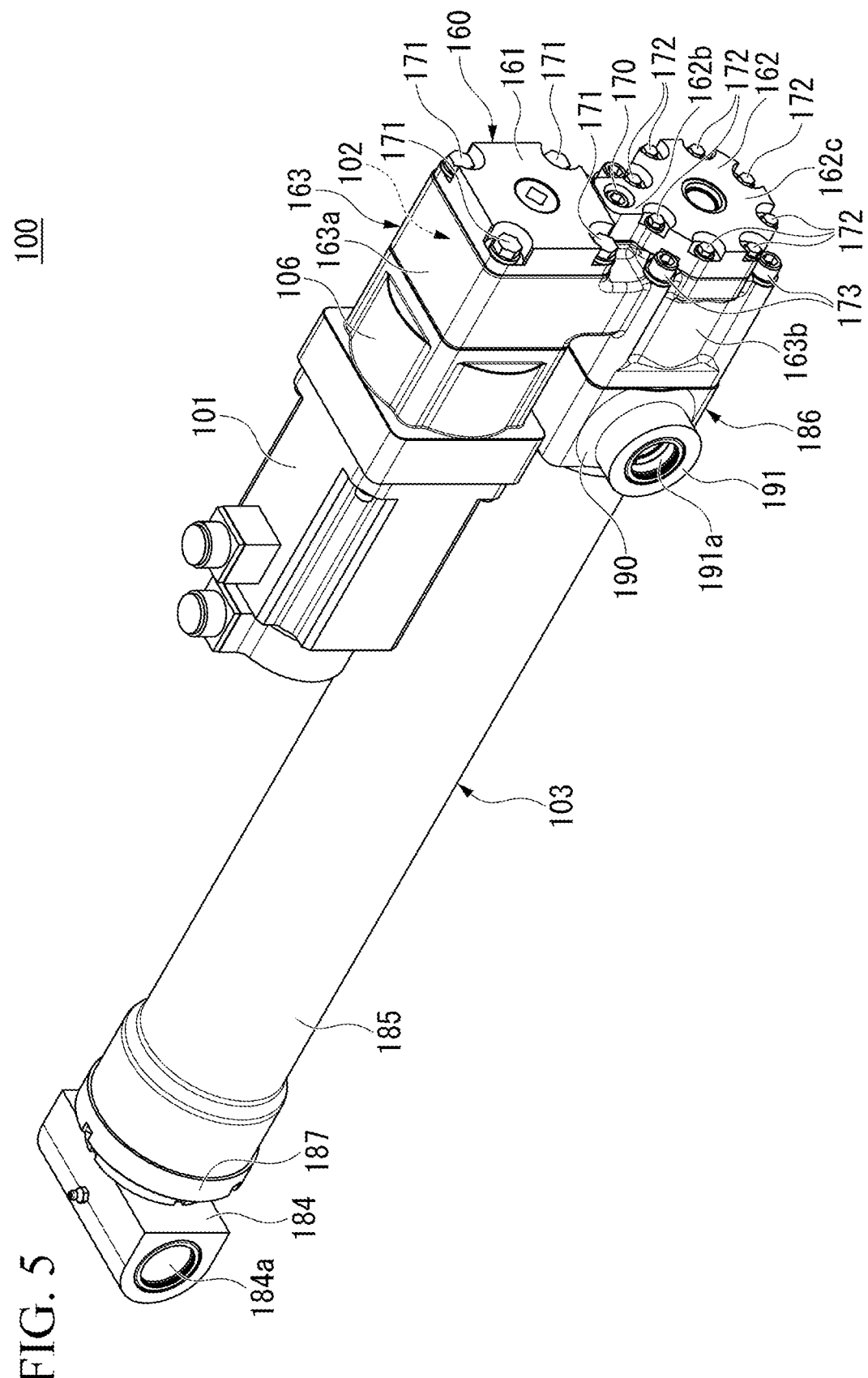
FIG. 5 is a perspective view of an electric cylinder according to the embodiment.

As illustrated in FIG. 1, the first electric cylinder 100A, the second electric cylinder 100B, and the third electric cylinder 100C are electric cylinders 100 common to each other. As illustrated in FIG. 5, the electric cylinder 100 includes a motor 101, a power transmission unit 102, and a cylinder main body 103.

Figure 8:
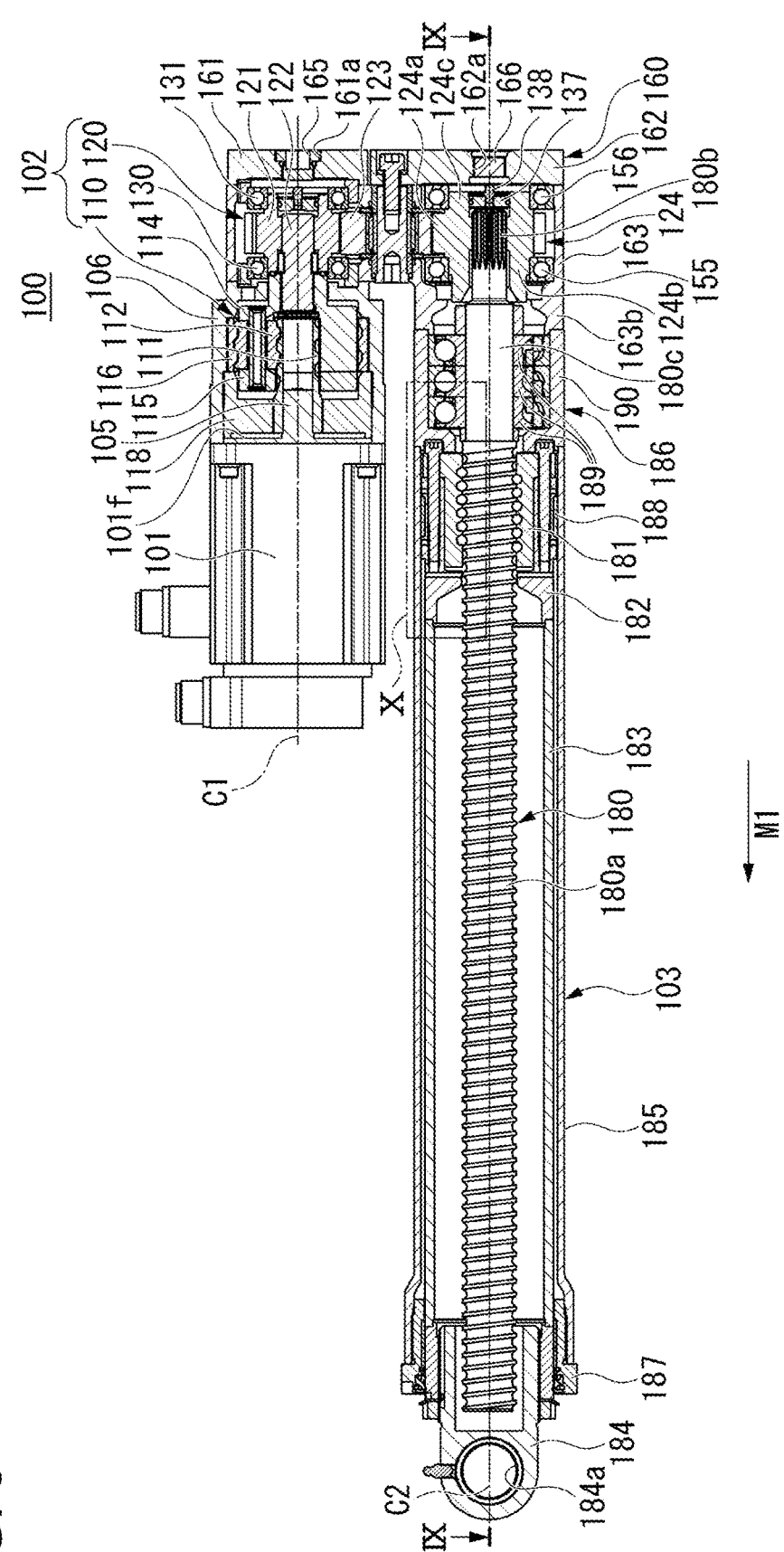
FIG. 8 is a view including a cross section along VIII-VIII in FIG. 7.

The motor 101 is a driving source for the electric cylinder 100. For example, the motor 101 is a servo motor. As illustrated in FIG. 8, the motor 101 and the cylinder main body 103 extend parallel to each other. The motor 101 and the cylinder main body 103 are arranged with a gap therebetween.

The electric cylinder 100 has an output shaft 105 rotating in response to driving of the motor 101. The output shaft 105 is provided coaxially with the central axis of the motor 101. The output shaft 105 protrudes outward in an axial direction from an end surface 101*f* of the motor 101 in the axial direction. In the diagrams, the sign C1 indicates a motor axis along the central axis of the motor 101.

The power transmission unit 102 transmits a driving force of the motor 101 to a piston 182. The power transmission unit 102 includes a planetary gear mechanism 110 for shifting a driving force of the output shaft 105 (for example, deceleration), and a transmission gear mechanism 120 for transmitting a driving force shifted by the planetary gear mechanism 110 to the piston 182.

The planetary gear mechanism 110 includes a sun gear 111 joined to the output shaft 105, a plurality of planetary gears 112 disposed adjacent to the sun gear 111, carriers 114 and 115 rotatably supporting central shafts of the plurality of planetary gears 112, and a ring gear 116 surrounding the plurality of planetary gears 112. The planetary gear mechanism 110 is covered by a case 106 having a cylindrical shape disposed adjacent to the end surface 101*f* of the motor 101 in the axial direction. A spacer 118 is provided between the end surface 101*f* of the motor 101 in the axial direction and the carriers 114 and 115.

The transmission gear mechanism 120 includes a transfer gear 121 transmitting rotational forces of the carriers 114 and 115 to the piston 182, a transfer shaft 122 extending outward in the axial direction from a position facing an outer end of the sun gear 111 in the axial direction, an idler gear 123 disposed adjacent to the transfer gear 121, and a driven gear 124 disposed on a side opposite to the transfer gear 121 with the idler gear 123 sandwiched therebetween. The transmission gear mechanism 120 is covered by a cover unit 160 disposed adjacent to the case 106.

The transfer gear 121 is provided coaxially with the output shaft 105. The transfer gear 121 is formed to have a cylindrical shape opening such that the transfer shaft 122 can be inserted therethrough. The transfer gear 121 is supported by an inner bearing 130 and an outer bearing 131 such that it can rotate around the motor axis C1 with respect to the cover unit 160.

The transfer shaft 122 is provided coaxially with the output shaft 105. The carrier 114 is coupled to the first end portion side of the transfer shaft 122 in the axial direction using a spline. The transfer gear 121 is coupled to the second end portion side of the transfer shaft 122 in the axial direction using a spline.

The idler gear 123 rotates in response to rotation of the transfer gear 121. The idler gear can rotate around the axis extending parallel to the transfer shaft 122.

The driven gear 124 is disposed adjacent to the idler gear 123. The driven gear 124 rotates in response to rotation of the idler gear 123. The driven gear 124 is provided coaxially with a cylinder shaft 180 accommodated inside the cylinder main body 103. In the diagrams, the sign C2 indicates a cylinder axis along the cylinder shaft 180.

The driven gear 124 is formed to have a cylindrical shape opening such that a first end portion of the cylinder shaft 180 can be inserted therethrough. The driven gear 124 includes a gear main body 124*a* having a cylindrical shape with outer teeth meshed with the idler gear 123, an inner cylinder body 124*b* protruding inward in the axial direction from the gear main body 124*a*, and an outer cylinder body 124*c* protruding outward in the axial direction from the gear main body 124*a*. The gear main body 124*a*, the inner cylinder body 124*b*, and the outer cylinder body 124*c* are integrally formed of the same member.

The driven gear 124 is supported by an inner bearing 155 provided in an outer circumference of the inner cylinder body 124*b* and an outer bearing 156 provided in an outer circumference of the outer cylinder body 124*c* such that it can rotate around the cylinder axis C2 with respect to the cover unit 160.

<Cover Unit>

The cover unit 160 includes a first cover 161 covering the transfer gear 121 from a side outward in the axial direction, a second cover 162 covering the driven gear 124 from a side outward in the axial direction, and a third cover 163 covering the transfer gear 121, the idler gear 123, and the driven gear 124 from a side outward in the radial direction of each of the gears.

Figure 7:
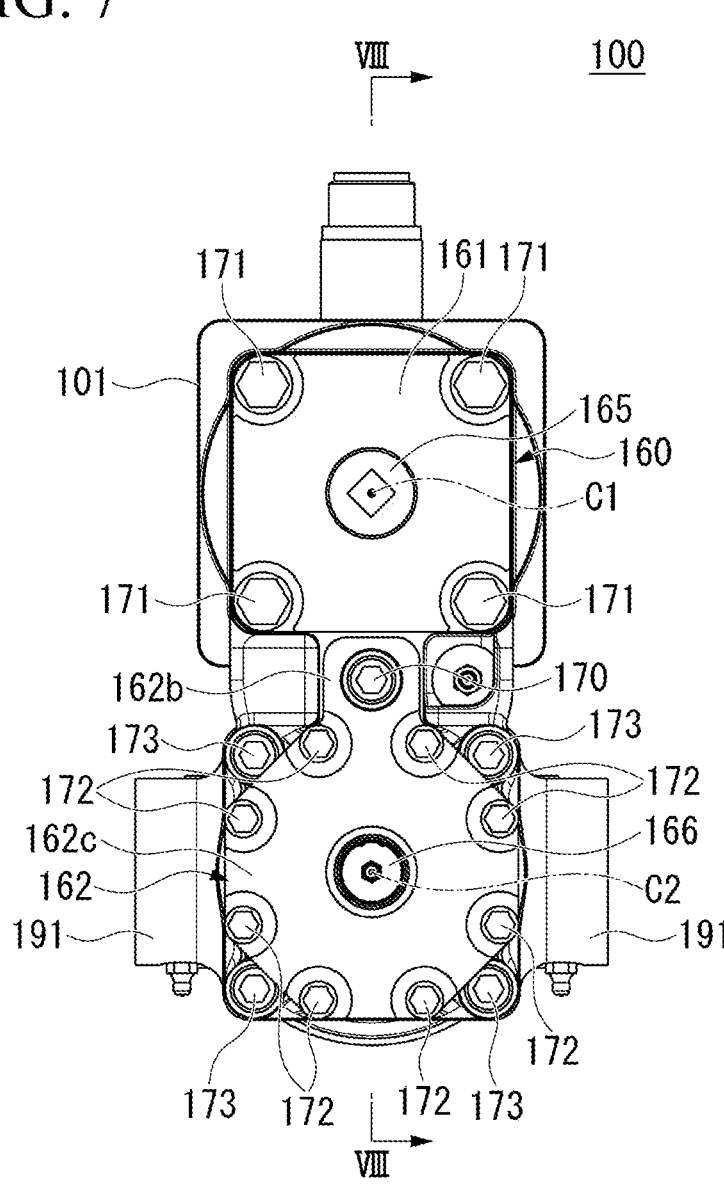
FIG. 7 is a view of the electric cylinder according to the embodiment viewed from the other side in the axial direction.

As illustrated in FIG. 7, the first cover 161 has a rectangular shape when viewed in the axial direction. As illustrated in FIG. 8, the first cover 161 has an open first supply opening 161*a* capable of supplying a lubricant to the second end portion side of the transfer shaft 122 in the axial direction from the outside. The first supply opening 161*a* is formed on the motor axis C1. A gap in which a lubricant can circulate is formed between an outer end portion of the transfer gear 121 in the axial direction and the first cover 161. A first lid member 165 is detachably attached to the first cover 161 such that the first supply opening 161*a* can be opened and closed.

As illustrated in FIG. 8, the second cover 162 has an open second supply opening 162*a* capable of supplying a lubricant to the first end portion of the cylinder shaft 180 from the outside. The second supply opening 162*a* is formed on the cylinder axis C2. A gap in which a lubricant can circulate is formed between the outer end portion of the driven gear 124 in the axial direction and the second cover 162. A second lid member 166 is detachably attached to the second cover 162 such that the second supply opening 162*a* can be opened and closed.

As illustrated in FIG. 7, when viewed in the axial direction, the second cover 162 includes an idler cover portion 162*b* provided at a position overlapping the idler gear 123, and a driven cover portion 162*c* provided at a position overlapping the driven gear 124. The idler cover portion 162*b* and the driven cover portion 162*c* are integrally formed of the same member. The idler cover portion 162*b* fixes the central axis of the idler gear 123 using a bolt 170.

As illustrated in FIG. 5, the third cover 163 includes a case side cover portion 163*a* provided between the case 106 and the first cover 161, and a screw side cover portion 163*b* provided between the cylinder main body 103 and the second cover 162.

The first cover 161 is jointly fastened to the case 106 with the case side cover portion 163*a* therebetween using a plurality of (for example, four In the present embodiment) bolts 171. An inner end portion of the case side cover portion 163*a* in the axial direction is coupled to an outer end portion of the case 106 in the axial direction by jointly fastening the bolts 171.

The driven cover portion 162*c* is fixed to the screw side cover portion 163*b* using a plurality of (for example, eight In the present embodiment) bolts 172. The screw side cover portion 163*b* is fixed to the cylinder main body 103 using a plurality of (for example, four In the present embodiment) bolts 173.

<Cylinder Main Body>

Figure 9:
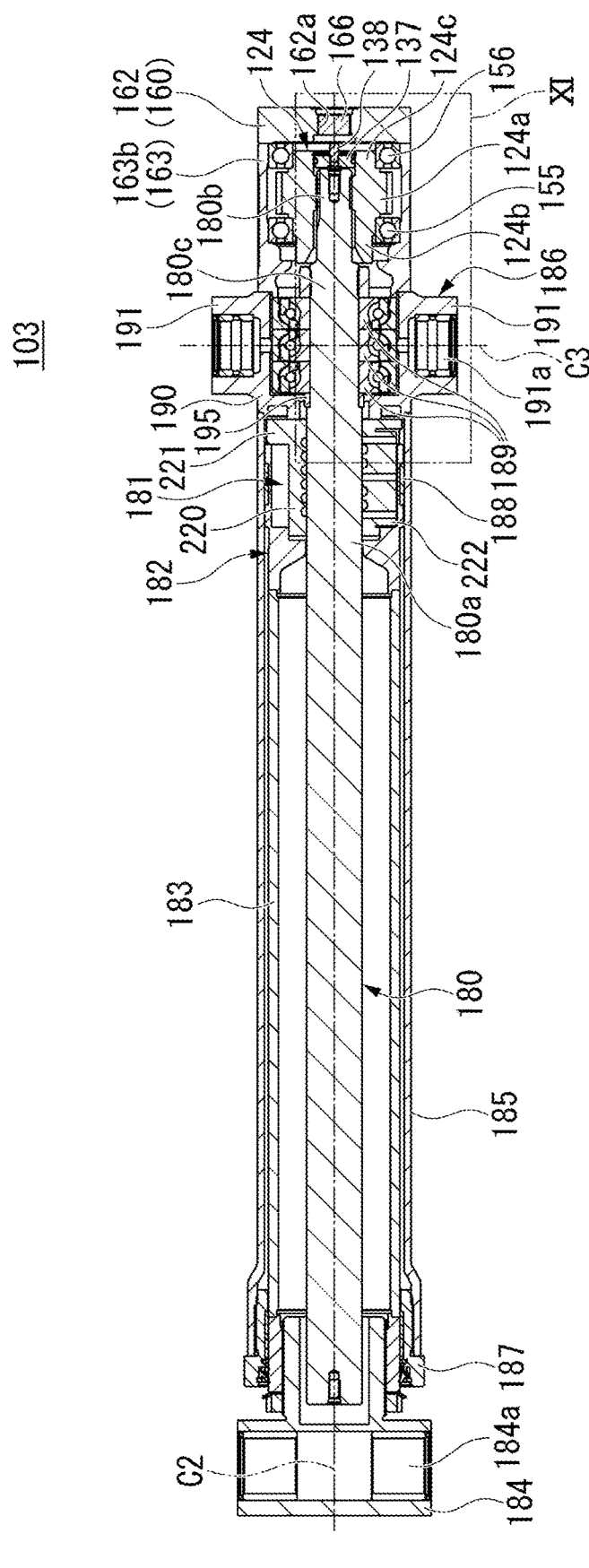
FIG. 9 is a view including a cross section along IX-IX in FIG. 8.

As illustrated in FIG. 9, the cylinder main body 103 includes the cylinder shaft 180 (which will hereinafter be simply referred to as "a shaft 180"), bearings 189 provided in an outer circumference of the shaft 180, a holder 186 surrounding the shaft 180 with the bearings 189 therebetween, a nut 181 screwed to a screw shaft 180*a* of the shaft 180, the piston 182 joined to the nut 181, a piston rod 183 having a cylindrical shape joined to the piston 182, a joint member 184 provided in a distal end portion of the piston rod 183, a cylinder tube 185 having a cylindrical shape accommodating the piston rod 183, and a rod cover 187 provided in a second end portion of the cylinder tube 185.

The shaft 180 includes the screw shaft 180*a* to which the nut 181 is screwed, a spline shaft 180*b* coupled to the driven gear 124 using a spline, and a joint shaft 180*c* joining the spline shaft 180*b* and the screw shaft 180*a* to each other. The spline shaft 180*b*, the joint shaft 180*c*, and the screw shaft 180*a* are provided coaxially with each other. The spline shaft 180*b*, the joint shaft 180*c*, and the screw shaft 180*a* are integrally formed of the same member.

The screw shaft 180*a* is disposed inside the cylinder tube 185. The screw shaft 180*a* has a larger diameter than the joint shaft 180*c*. The screw shaft 180*a* is longer than the joint shaft 180*c* in the axial direction. The screw shaft 180*a* is longer than the cylinder tube 185 in the axial direction.

The spline shaft 180*b* is disposed inside the screw side cover portion 163*b* of the third cover 163. An outer circumference of the spline shaft 180*b* is provided with outer teeth having a tooth surface parallel to the axial direction of the spline shaft 180*b* and meshed with inner teeth of the gear main body 124*a* of the driven gear 124. A gap in which a lubricant can circulate is formed between the outer teeth of the spline shaft 180*b* and the inner teeth of the gear main body 124*a*.

The joint shaft 180*c* is disposed inside the holder 186. The joint shaft 180*c* is formed to have a columnar shape having a larger diameter than the spline shaft 180*b*. The joint shaft 180*c* is longer than the spline shaft 180*b* in the axial direction.

The bearings 189 are provided in an outer circumference of the joint shaft 180*c*. A plurality of bearings 189 are provided on the joint shaft 180*c*. The plurality of (for example, three In the present embodiment) bearings 189 are disposed adjacent to each other in the axial direction.

In the diagrams, the sign 195 indicates a spacer provided between the bearings 189 and the screw shaft 180*a* on the joint shaft 180*c*, and the sign 196 indicates a lock nut provided between the bearings 189 and the driven gear 124 on the joint shaft 180*c*, respectively. A gap in which a lubricant can circulate is formed between the spacer 195 and the holder 186. A gap in which a lubricant can circulate is formed between the lock nut 196 and the driven gear 124.

The piston 182 is constituted to be able to move integrally with the nut 181 on the screw shaft 180*a*. The piston rod 183 is constituted to be able to move integrally with the piston 182 along the cylinder axis C2.

Figure 6:
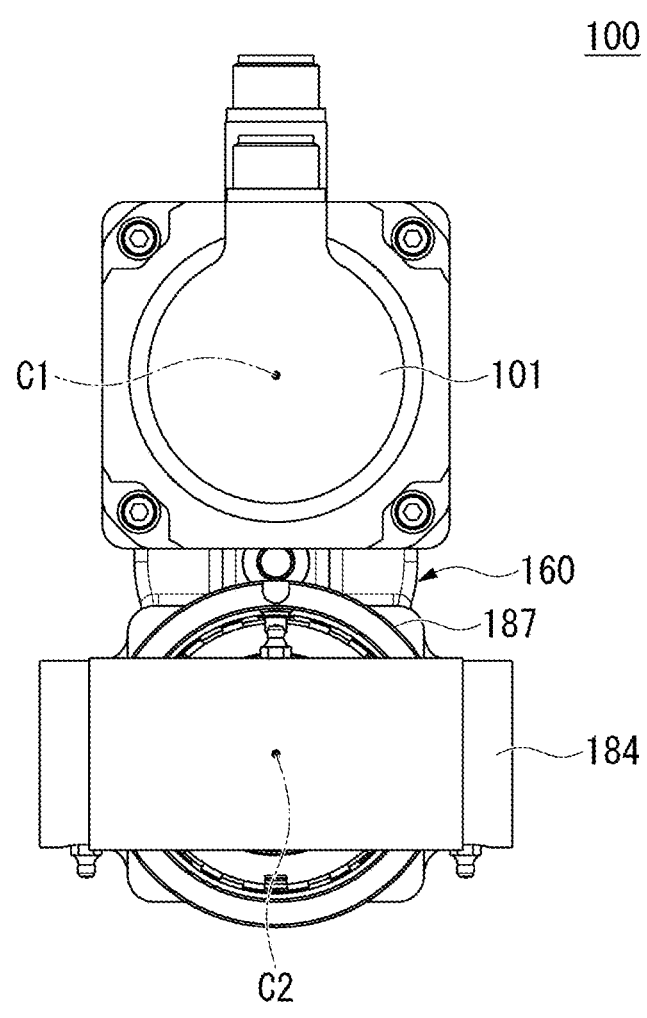
FIG. 6 is a view of the electric cylinder according to the embodiment viewed from one side in an axial direction.

As illustrated in FIG. 6, the joint member 184 protrudes outward beyond an outer circumferential edge of the rod cover 187. As illustrated in FIG. 8, the joint member 184 has a connection hole 184*a* opening in a direction orthogonal to the cylinder axis C2. A bearing 188 is provided between an inner circumferential surface of the cylinder tube 185 and an outer circumferential surface of the piston 182.

<Holder>

As illustrated in FIG. 9, the holder 186 is provided on the outward side of the joint shaft 180*c* in the radial direction. The holder 186 is provided between a first end portion of the cylinder tube 185 and the screw side cover portion 163*b*. The holder 186 surrounds the shaft 180 with the plurality of bearings 189 therebetween.

The holder 186 includes a holder main body 190 opening in the axial direction of the shaft 180 and supporting the shaft 180 with the plurality of bearings 189 therebetween, and trunnion portions 191 having a cylindrical shape protruding outward in the radial direction from the holder main body 190. The holder 186 is constituted so as to allow a lubricant to circulate therein from a side outward in the axial direction of the holder main body 190 toward inner circumferences of the trunnion portions 191.

Figure 11:
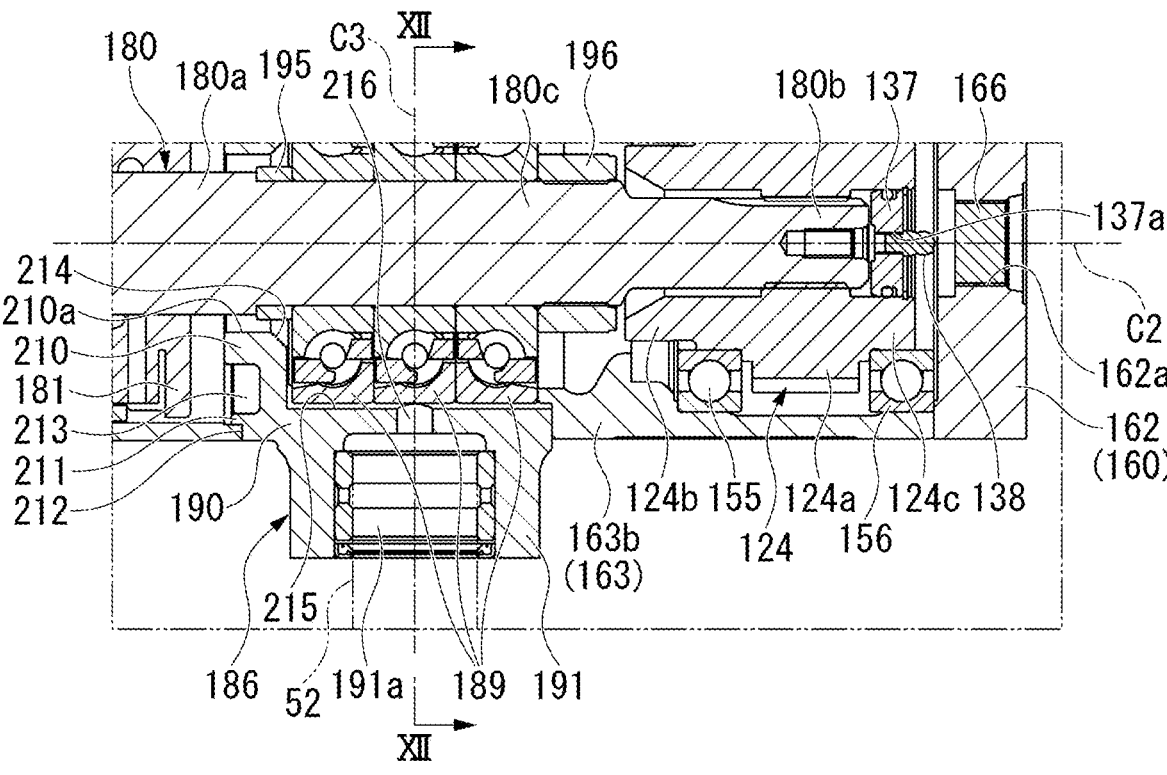
FIG. 11 is an enlarged view of XI part in FIG. 9.

The holder main body 190 has a rectangular external shape along the external shape of the screw side cover portion 163*b* when viewed in the axial direction. As illustrated in FIG. 11, the holder 186 includes a protruding cylinder body 210 protruding outward in the axial direction from the holder main body 190 and formed to have a cylindrical shape which is coaxial with the shaft 180, and an annularly projecting portion 211 formed to have an annular shape having a larger diameter than the protruding cylinder body 210. The protruding cylinder body 210 and the annularly projecting portion 211 are integrally formed of the same member as that of the holder main body 190.

The protruding cylinder body 210 protrudes toward the nut 181. The protruding cylinder body 210 protrudes in a manner of being longer than the annularly projecting portion 211 in the axial direction. An inner circumferential surface 210*a* of the protruding cylinder body 210 is separated to the outward side in the radial direction from the shaft 180 throughout the outer circumference of the shaft 180. A gap in which a lubricant can circulate is formed between the inner circumferential surface 210*a* of the protruding cylinder body 210 and an outer circumferential edge of the shaft 180.

The annularly projecting portion 211 protrudes toward an inner circumference of the first end portion of the cylinder tube 185. The holder 186 has an annular surface 212 along an outer circumference of the annularly projecting portion 211. The annular surface 212 of the holder 186 is coupled to the first end portion of the cylinder tube 185 by welding (for example, full-circled welding).

The holder 186 has an annularly recessed portion 213 opening outward in the axial direction such that a lubricant can be stored therein and formed to have an annular shape along an outer circumference of the protruding cylinder body 210. The annularly recessed portion 213 is provided between the protruding cylinder body 210 and the annularly projecting portion 211. The annularly recessed portion 213 has a uniform depth (length in the axial direction) throughout the outer circumference of the protruding cylinder body 210.

Figure 13:
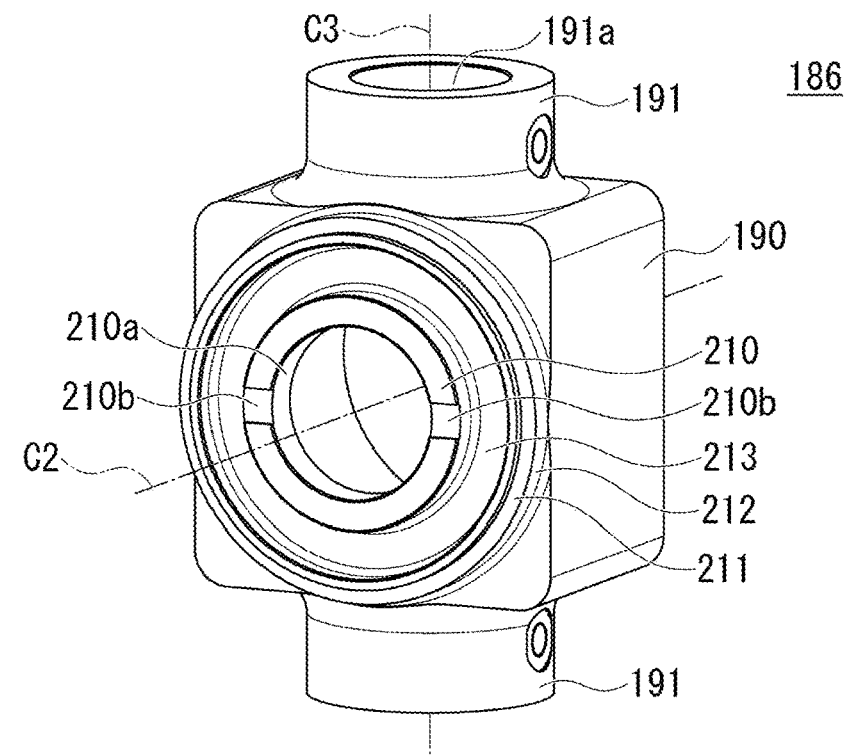
FIG. 13 is a perspective view of the holder according to the embodiment.

As illustrated in FIG. 13, the protruding cylinder body 210 has outer guide grooves 210*b* extending from the outward side of the annularly recessed portion 213 in the axial direction toward an inner circumference of the protruding cylinder body 210 and recessed so as to allow a lubricant to circulate therein. The depths of the outer guide grooves 210*b* (lengths in the axial direction) are shallower than the depth of the annularly recessed portion 213 (length in the axial direction). A plurality of (for example, two in the present embodiment) outer guide grooves 210*b* are provided with a gap therebetween in a circumferential direction. The two outer guide grooves 210*b* are formed on an imaginary line orthogonal to the cylinder axis C2.

As illustrated in FIG. 11, the holder 186 has an inclined surface 214 inclined in a manner of being positioned on the outward side in the radial direction (trunnion portions 191 side) from an inner end portion of the inner circumferential surface 210*a* of the protruding cylinder body 210 in the axial direction (an end portion on the bearings 189 side) toward the inward side (bearings 189 side) in the axial direction. The inclined surface 214 is provided throughout an inner circumference of an inner end portion of the protruding cylinder body 210 in the axial direction.

Figure 14:
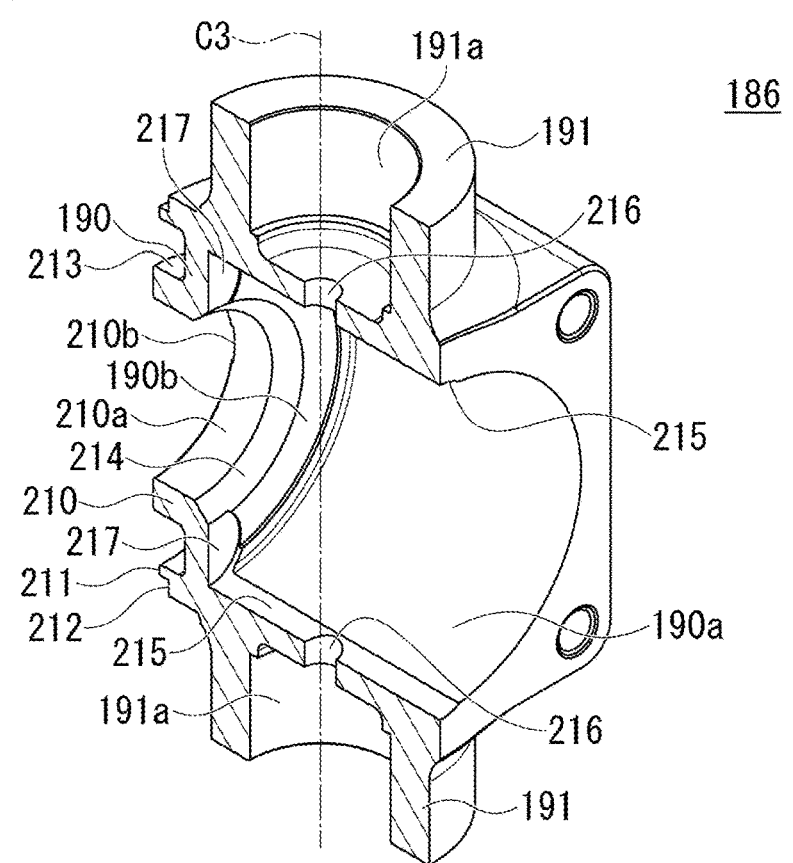
FIG. 14 is a perspective view including a cross section of the holder according to the embodiment cut along a plane including a cylinder axis and a trunnion axis.

As illustrated in FIG. 14, the holder 186 has inner guide grooves 215 extending throughout an inner circumferential surface 190*a* of the holder main body 190 in the axial direction and recessed so as to allow a lubricant to circulate therein, and opening holes 216 opening outward in the radial direction from the inner guide grooves 215 at the centers of the trunnion portions 191 in the radial direction. The opening holes 216 open along a central axis C3 (which will hereinafter be referred to as "a trunnion axis C3") of each of the trunnion portions 191.

The inner circumferential surface 190*a* of the holder main body 190 is separated to the outward side in the radial direction from an outer circumferential edge of the inclined surface 214. An inward surface 190*b* of the holder main body 190 in the axial direction is provided with relay grooves 217 connecting the inclined surface 214 and the inner guide grooves 215 to each other. The relay grooves 217 are curved from the inclined surface 214 toward end portions of the inner guide grooves 215 in the axial direction. A plurality of (for example, two in the present embodiment) inner guide grooves 215 are provided with a gap in the circumferential direction. As illustrated in FIG. 11, when viewed in the radial direction, the opening holes 216 are disposed at positions overlapping central portions of the plurality of bearings 189 in the axial direction.

As illustrated in FIG. 13, a pair of trunnion portions 191 are provided on both side surfaces of the holder main body 190. The trunnion portions 191 extend in a direction orthogonal to a direction in which the outer guide grooves 210*b* extend. Each of the trunnion portions 191 has a connection hole 191*a* opening in a direction orthogonal to the cylinder axis C2 (a direction along the trunnion axis C3). As illustrated in FIG. 9, the connection holes 191*a* of the trunnion portions 191 open parallel to the connection hole 184*a* of the joint member 184.

As illustrated in FIG. 11, the pin which has been described above (in the example of the diagram, the pin 52 inserted through the first cylinder base end side hole 21*a* of the boom 20 illustrated in FIG. 2) is inserted through the connection holes 191*a* of the trunnion portions 191. When the electric cylinder 100 is mounted in the boom 20, the connection holes 191*a* of the trunnion portions 191 open in the vehicle width direction of the upper swing body 6. The electric cylinder 100 is supported turnably around the central axis of the pin 52 due to the pin 52 inserted through the first cylinder base end side hole 21*a* serving as a penetration hole of the boom 20 and the connection holes 191*a* of the trunnion portions 191 serving as connection holes of the electric cylinder 100.

Figure 12:
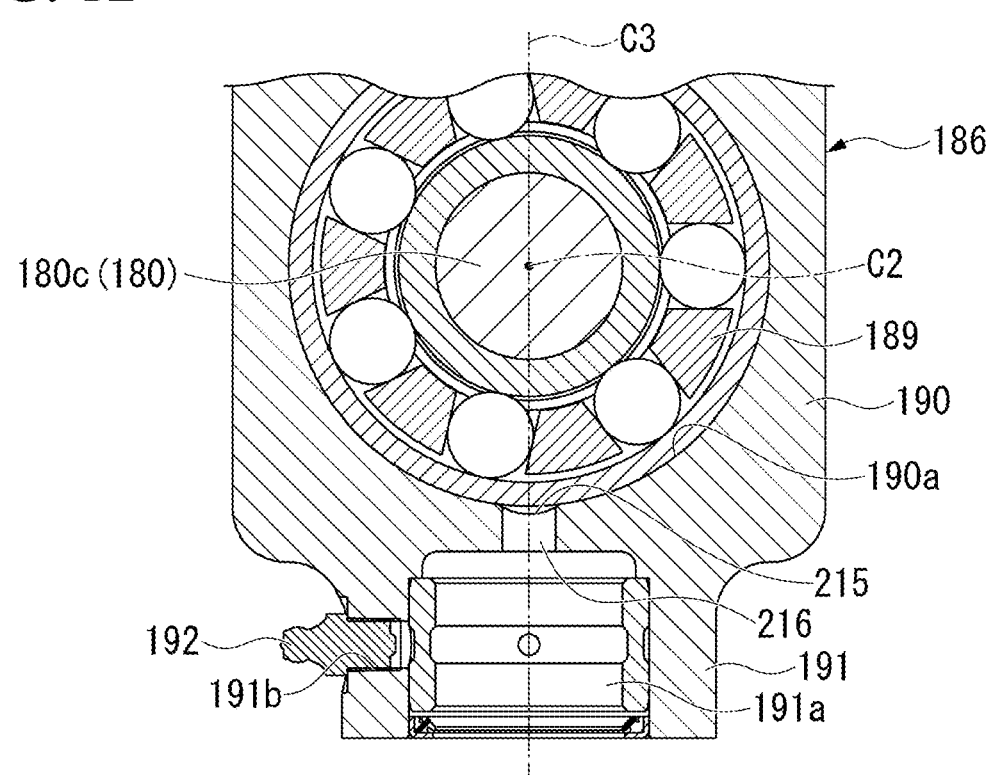
FIG. 12 is a view including a cross section along XII-XII in FIG. 11.

As illustrated in FIG. 12, each of the trunnion portions 191 has a supply hole 191*b* opening so as to allow a lubricant to be supplied to the connection hole 191*a* from the outside. The supply hole 191*b* opens in a direction orthogonal to each of the cylinder axis C2 and the trunnion axis C3. The supply hole 191*b* is provided in one side portion of the trunnion portion 191 in the radial direction. The one side portion of the trunnion portion 191 in the radial direction is provided with a grease nipple 192 capable of being opened and closed so as to allow a lubricant to be supplied to the supply hole 191*b* from the outside.

<Nut>

As illustrated in FIG. 8, the screw shaft 180*a* and the nut 181 constitute a ball screw converting rotational motion of the motor 101 into rectilinear motion. Balls (not illustrated) are interposed between the screw shaft 180*a* and the nut 181.

As illustrated in FIG. 9, the nut 181 includes a nut main body 220 having a cylindrical shape provided on the screw shaft 180*a*, a nut flange 221 protruding outward in the radial direction from a first end portion of the nut main body 220 in the axial direction (an end portion on the holder 186 side), and circulation components 222 for circulating balls (not illustrated).

Figure 10:
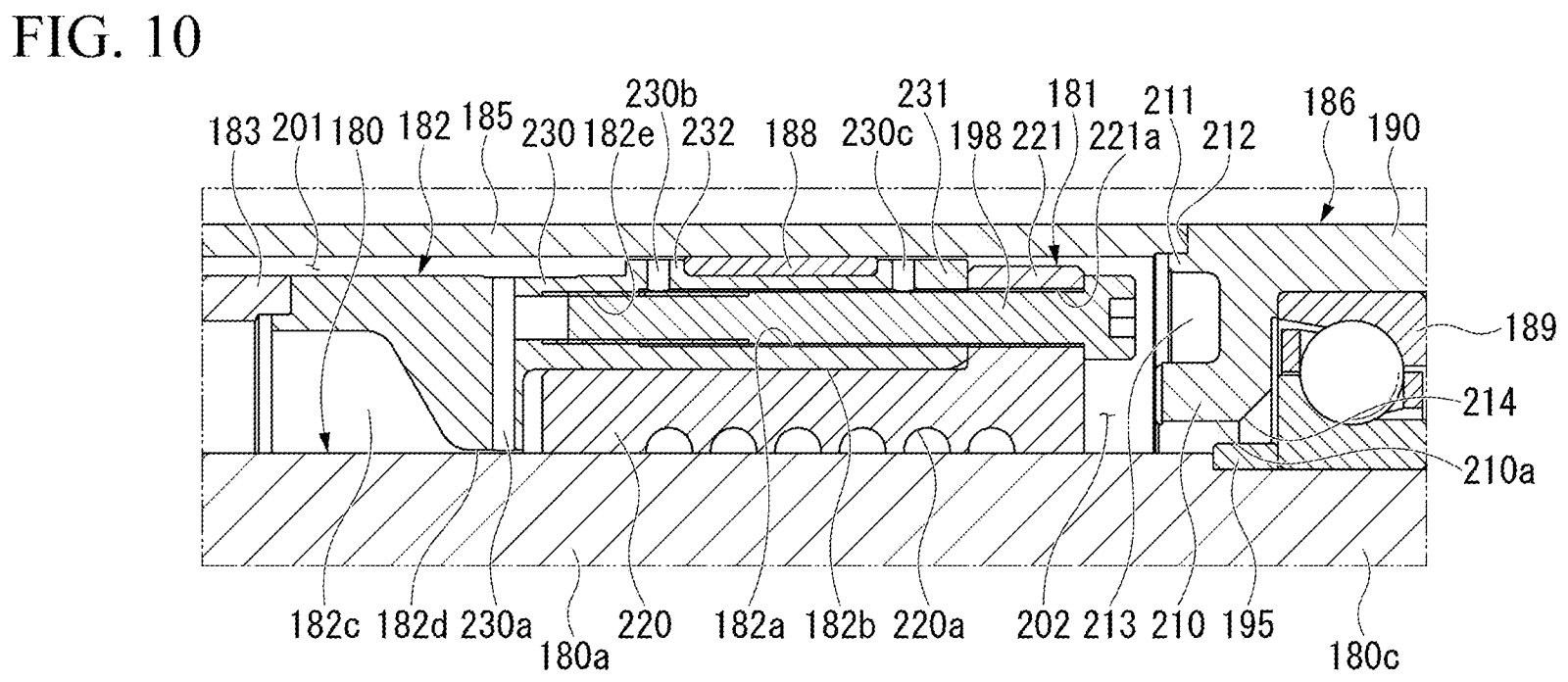

As illustrated in FIG. 10, an inner circumferential surface of the nut main body 220 is provided with spirally recessed portions 220*a* where the balls enters.

The nut flange 221 has a bolt hole 221*a* opening in the axial direction such that a bolt 198 can be inserted therethrough. An outer circumferential edge of the nut flange 221 is separated to the inward side in the radial direction from the inner circumferential surface of the cylinder tube 185.

As illustrated in FIG. 9, the circulation components 222 is provided on one side portion of the nut main body 220 in the radial direction.

<Piston>

As illustrated in FIG. 10, the piston 182 is joined to the nut 181 using the bolt 198 extending in the axial direction. The piston 182 has bolt holes 182*a* opening such that the bolt 198 can be inserted therethrough, a nut side recessed portion 182*b* opening such that the nut main body 220 and the circulation components 222 can be accommodating therein, a rod side recessed portion 182*c* opening toward the piston rod 183, and a piston axis hole 182*d* opening such that the screw shaft 180*a* can be inserted therethrough. The piston 182 is constituted so as to allow a lubricant to circulate therein from a position facing an outer circumference of the screw shaft 180*a* toward an inner circumference of the cylinder tube 185.

Figure 15:
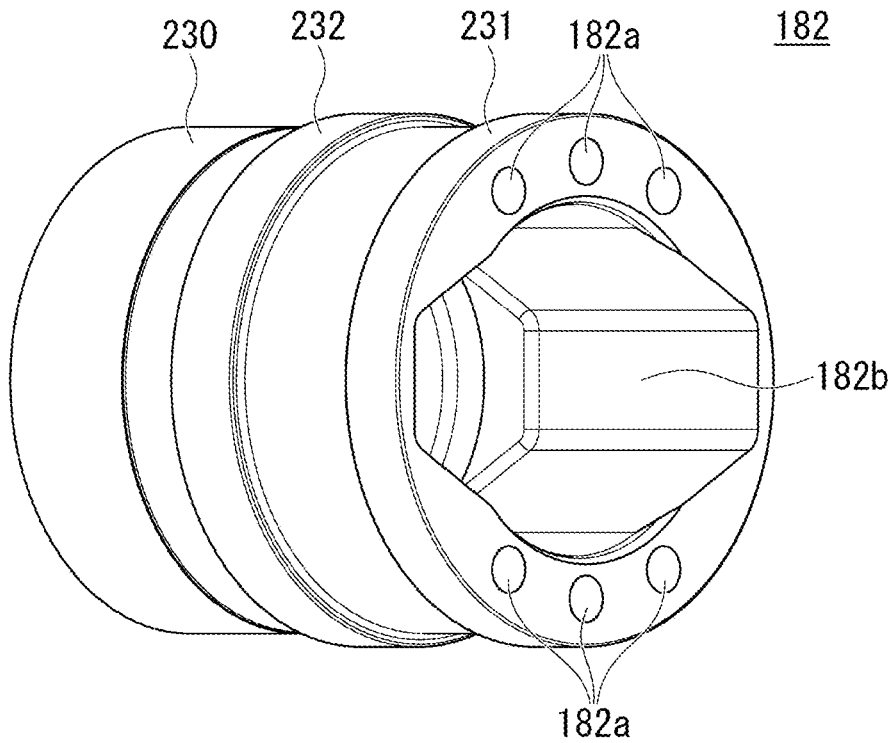
FIG. 15 is a perspective view of a piston according to the embodiment.

As illustrated in FIG. 15, a plurality of (for example, six In the present embodiment) bolt holes 182*a* are provided. The bolt holes 182*a* are disposed on both sides the piston 182 in the radial direction with the nut side recessed portion 182*b* sandwiched therebetween. Regarding the plurality of bolt holes 182*a*, three bolt holes are provided on each side on the outward side of the nut side recessed portion 182*b* in the radial direction. The three bolt holes 182*a* on one side are disposed away from each other at equal intervals in the circumferential direction of the piston 182.

The nut side recessed portion 182*b* is recessed to the inward side in the axial direction from a first end portion of the piston 182 (an end portion on the nut 181 side). The nut side recessed portion 182*b* has an external shape in which a circular shape and two trapezoidal shapes are combined when viewed in the axial direction. The nut main body 220 is accommodated in a circular space when viewed in the axial direction in the nut side recessed portion 182*b*. The circulation components 222 is accommodated in one space having a trapezoidal shape when viewed in the axial direction in the nut side recessed portion 182*b*.

As illustrated in FIG. 10, the rod side recessed portion 182*c* is recessed to the inward side in the axial direction from a second end portion of the piston 182 (an end portion on the piston rod 183 side). An inner circumferential edge of the rod side recessed portion 182*c* linearly extends toward the inward side in the axial direction from the second end portion of the piston 182 and then is inclined such that it approaches the screw shaft 180*a* toward the inward side in the axial direction.

The piston axis hole 182*d* is formed to have a circular shape which is coaxial with the screw shaft 180*a* when viewed in the axial direction. The piston axis hole 182*d* allows the nut side recessed portion 182*b* and the rod side recessed portion 182*c* to communicate with each other in the axial direction.

Figure 16:
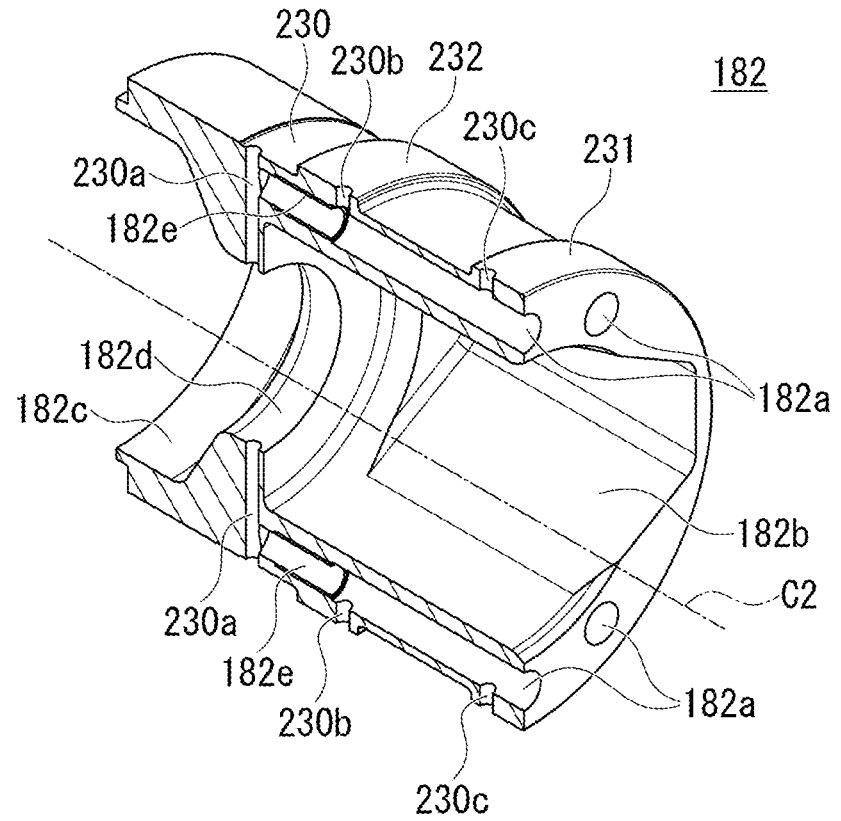
FIG. 16 is a perspective view including a cross section of the piston according to the embodiment cut along a plane including the cylinder axis and the trunnion axis.

As illustrated in FIG. 16, the piston 182 includes a piston main body 230 having a cylindrical shape along the cylinder axis C2, a bottom side projection portion 231 protruding outward in the radial direction from a first end portion of the piston main body 230 (an end portion on the holder 186 side), and a head side projection portion 232 protruding outward in the radial direction from the second end portion of the piston 182 side (piston rod 183 side) beyond the bottom side projection portion 231. The piston main body 230, the bottom side projection portion 231, and the head side projection portion 232 are integrally formed of the same member.

The bottom side projection portion 231 and the head side projection portion 232 are provided throughout an outer circumference of the piston main body 230. As illustrated in FIG. 10, the bearing 188 is provided between the bottom side projection portion 231 and the head side projection portion 232. A gap in which a lubricant can circulate is formed between an outer circumferential edge of the bottom side projection portion 231 and the inner circumferential surface of the cylinder tube 185. A gap in which a lubricant can circulate is formed between an outer circumferential surface of the head side projection portion 232 and the inner circumferential surface of the cylinder tube 185.

A head side space 201 (first space) in which a lubricant can circulate is formed between the piston rod 183 and the cylinder tube 185. The head side space 201 is a space surrounded by the cylinder tube 185, the piston rod 183, and the piston 182 (the piston main body 230 and the head side projection portion 232 on the piston rod 183 side). An end portion of the head side projection portion 232 on a side opposite to the bearing 188 in the axial direction of the piston 182 faces the head side space 201.

A bottom side space 202 (second space) in which a lubricant can circulate is formed between the piston 182 and the holder 186. The bottom side space 202 is a space surrounded by the cylinder tube 185, the screw shaft 180*a*, the nut 181, and the piston 182 (bottom side projection portion 231). An end portion of the bottom side projection portion 231 on a side opposite to the bearing 188 in the axial direction of the piston 182 faces the bottom side space 202.

The piston 182 has first guide holes 230*a* extending from a position facing the outer circumference of the screw shaft 180*a* toward the inner circumference of the cylinder tube 185, and a second guide hole 230*b* and a third guide hole 230*c* provided at positions different from those of the first guide holes 230*a* and disposed away from each other in the axial direction. Each of the first guide holes 230*a*, the second guide hole 230*b*, and the third guide opens so as to allow a lubricant to circulate therein.

As illustrated in FIG. 16, a pair of first guide holes 230*a* are disposed on both sides of the piston 182 in the radial direction with the piston axis hole 182*d* sandwiched therebetween. The pair of first guide holes 230*a* are formed on an imaginary line orthogonal to the cylinder axis C2. The first guide holes 230*a* extend outward in the radial direction from the piston axis hole 182*d* and open on the outer circumferential surface of the piston main body 230. As illustrated in FIG. 10, the first guide holes 230*a* allow the piston axis hole 182*d* and the head side space 201 to communicate with each other.

The second guide hole 230*b* extends from a position facing an outer circumference of the bolt 198 toward the inner circumference of the cylinder tube 185. The second guide hole 230*b* extends parallel to the first guide holes 230*a*. The second guide hole 230*b* extends outward in the radial direction from the bolt holes 182*a* and open on the outer circumferential surface of the head side projection portion 232. The second guide hole 230*b* allows the bolt holes 182*a* and the head side space 201 to communicate with each other.

The third guide hole 230*c* extends parallel to the second guide hole 230*b* from a position facing the outer circumference of the bolt 198 toward the inner circumference of the cylinder tube 185. The third guide hole 230*c* extends outward in the radial direction from the bolt holes 182*a* and open on an outer circumferential surface of the bottom side projection portion 231. The third guide hole 230*c* allows the bolt holes 182*a* and the bottom side space 202 to communicate with each other.

The bolt holes 182*a* extend in the axial direction throughout a part between the first end portion of the piston 182 (an end portion on the holder 186 side) and the first guide holes 230*a*. A female screw portion 182*e* to which a male screw portion of the bolt 198 is screwed is formed in an inner circumference between the first guide holes 230*a* and the second guide hole 230*b* in the axial direction of the bolt holes 182*a*. A gap in which a lubricant can circulate is formed in an inner circumference between the second guide hole 230*b* and the third guide hole 230*c* (in other words, the outer circumference of the bolt 198) in the axial direction of the bolt holes 182*a*.

<Cover Member>

As illustrated in FIG. 11, a cover member 137 covering an outer end portion of the shaft 180 in the axial direction from a side outward in the axial direction is detachably attached to the outer cylinder body 124*c* of the driven gear (rotor). The cover member 137 has a supply hole 137*a* opening so as to allow a lubricant to be supplied to the outer end portion of the shaft 180 in the axial direction from the outside. The supply hole 137*a* is formed on the cylinder axis C2. A gap in which a lubricant can circulate is formed between the outer end portion of the shaft 180 in the axial direction and the cover member 137.

A grease nipple 138 capable of being opened and closed so as to allow a lubricant to be supplied to the supply hole 137*a* from the outside is provided in the cover member 137. The grease nipple 138 is provided on the cylinder axis C2. The grease nipple 138 extends outward in the axial direction beyond the cover member 137. The grease nipple 138 has a lubricant injection port (not illustrated) leading to the supply hole 137*a*. The grease nipple 138 has a check valve in which beads are pressed against the injection port from the inside by a spring. The grease nipple 138 can be opened and a lubricant can be supplied to the supply hole 137*a* through the injection port by connecting a grease gun or the like to the grease nipple 138 and applying a pressure thereto, for example.

<Operation of Electric Cylinder>

Hereinafter, an example of operation of the electric cylinder 100 will be described.

As illustrated in FIG. 8, a driving force from the motor 101 is decelerated through the power transmission unit 102 and is transmitted to the cylinder shaft 180. Specifically, a driving force from the motor 101 is a rotational force around the motor axis C1 and is decelerated by the output shaft 105, the sun gear 111, the plurality of planetary gears 112, and the carriers 114 and 115. A rotational force decelerated by the carriers 114 and 115 is transmitted to the transfer gear 121 through the transfer shaft 122. A rotational force transmitted to the transfer gear 121 is transmitted to the cylinder shaft 180 through the idler gear 123 and the driven gear 124.

For example, when the motor 101 is rotated forward, the cylinder shaft 180 rotates in one direction around the cylinder axis C2. In response to rotation of the cylinder shaft 180 in one direction, the nut 181 screwed to the screw shaft 180a of the cylinder shaft 180 moves on the cylinder axis C2 in an arrow M1 direction. Due to movement of the nut 181 in the arrow M1 direction, the piston 182, the piston rod 183, and the joint member 184 integrally move in the arrow M1 direction. Accordingly, the cylinder main body 103 extends.

On the other hand, if the motor 101 rotates backward in a state in which the cylinder main body 103 extends, the cylinder shaft 180 rotates in the other direction around the cylinder axis C2. In response to rotation of the cylinder shaft 180 in the other direction, the nut 181 screwed to the screw shaft 180a of the cylinder shaft 180 moves on the cylinder axis C2 in a direction opposite to the arrow M1 direction. Due to movement of the nut 181 in a direction opposite to the arrow M1 direction, the piston 182, the piston rod 183, and the joint member 184 integrally move in a direction opposite to the arrow M1 direction. Accordingly, the cylinder main body 103 retracts.

In this manner, the electric cylinder 100 is constituted such that the cylinder main body 103 extends and retracts due to forward and backward rotation of the motor 101.

<Flow of Lubricant>

Hereinafter, an example of a flow of a lubricant will be described.

First, an example of a flow of a lubricant when the cylinder main body 103 extends will be described.

Figure 17:
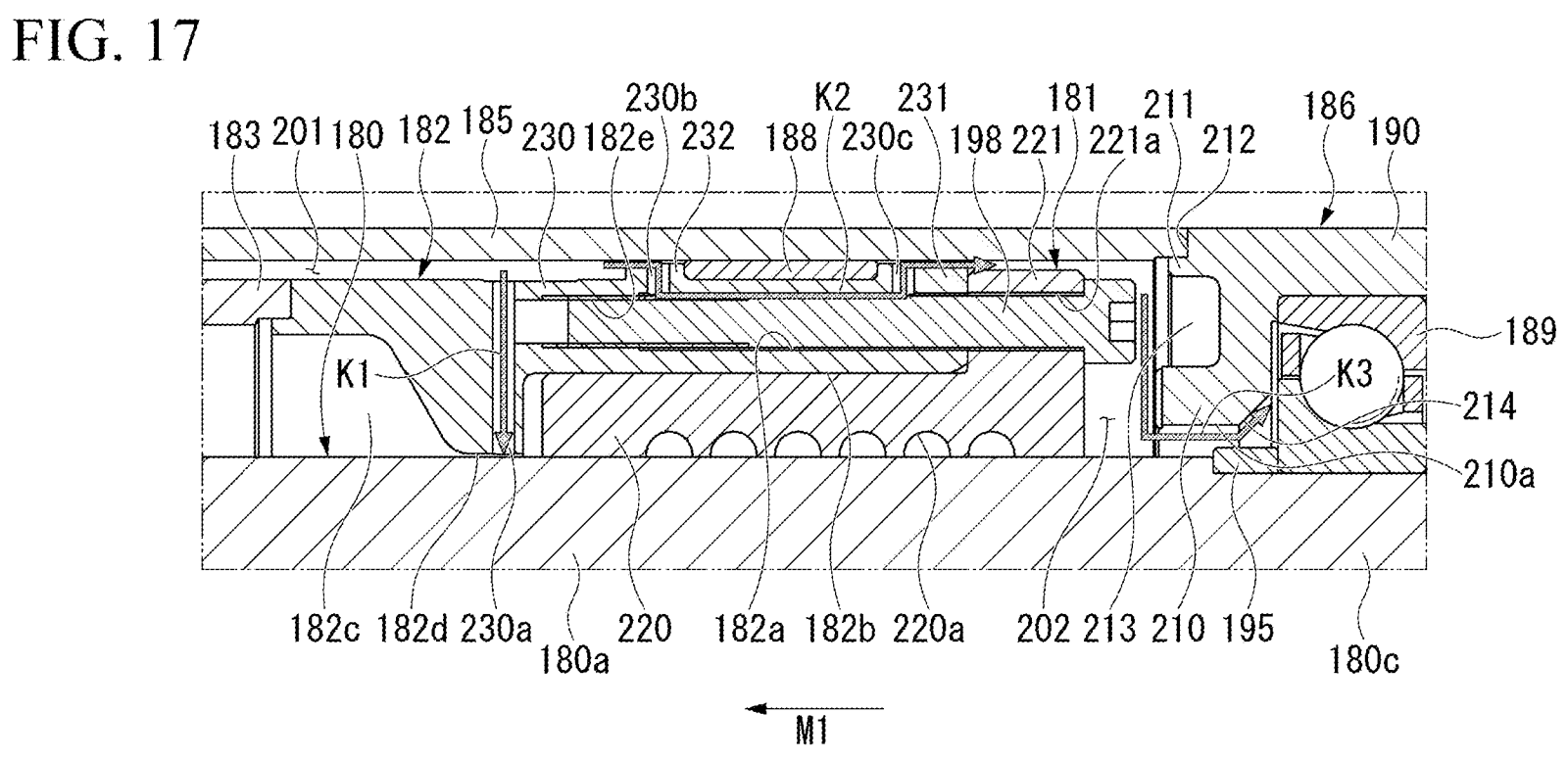

As illustrated in FIG. 17, when the cylinder main body 103 extends, the piston 182 moves in the arrow M1 direction. Accordingly, the head side space 201 contracts. Consequently, a lubricant and air which could not enter the inside of the head side space 201 flow in an arrow K1 direction through the first guide holes 230a and enter an outer circumferential side (gap) of the screw shaft 180a.

On the other hand, a lubricant and air which could not enter the inside of the head side space 201 due to contraction of the head side space 201 flow in an arrow K2 direction through the second guide hole 230b, the outer circumference of the bolt 198, and the third guide hole 230c and enter the inside of the bottom side space 202. The lubricant which has flowed into the bottom side space 202 is utilized again for lubrication of movement destinations.

Next, an example of a flow of a lubricant when the cylinder main body 103 retracts will be described.

When the cylinder main body 103 retracts, the piston 182 moves in a direction opposite to the arrow M1 direction. Accordingly, the head side space 201 expands. For this reason, air enters the inside of the head side space 201 through the first guide holes 230a and the second guide hole 230b.

On the other hand, the bottom side space 202 contracts due to movement of the piston 182 in a direction opposite to the arrow M1 direction. Consequently, a portion of the lubricant flows in a direction opposite to the arrow K2 direction through the second guide hole 230b and enters the inside of the head side space 201. The lubricant which has flowed into the head side space 201 is utilized again for lubrication of movement destinations.

Meanwhile, if the bottom side space 202 contracts, another portion of the lubricant flows in the arrow K2 direction through the third guide hole 230c and enters the inside of the bottom side space 202. The lubricant which has flowed into the bottom side space 202 is utilized again for lubrication of movement destinations.

A portion of the lubricant which has flowed into the bottom side space 202 flows in an arrow K3 direction along the protruding cylinder body 210 of the holder 186 and enters an inner circumferential side of the holder 186. Accordingly, the bearings 189 inside the holder 186 can be lubricated.

Figure 18:
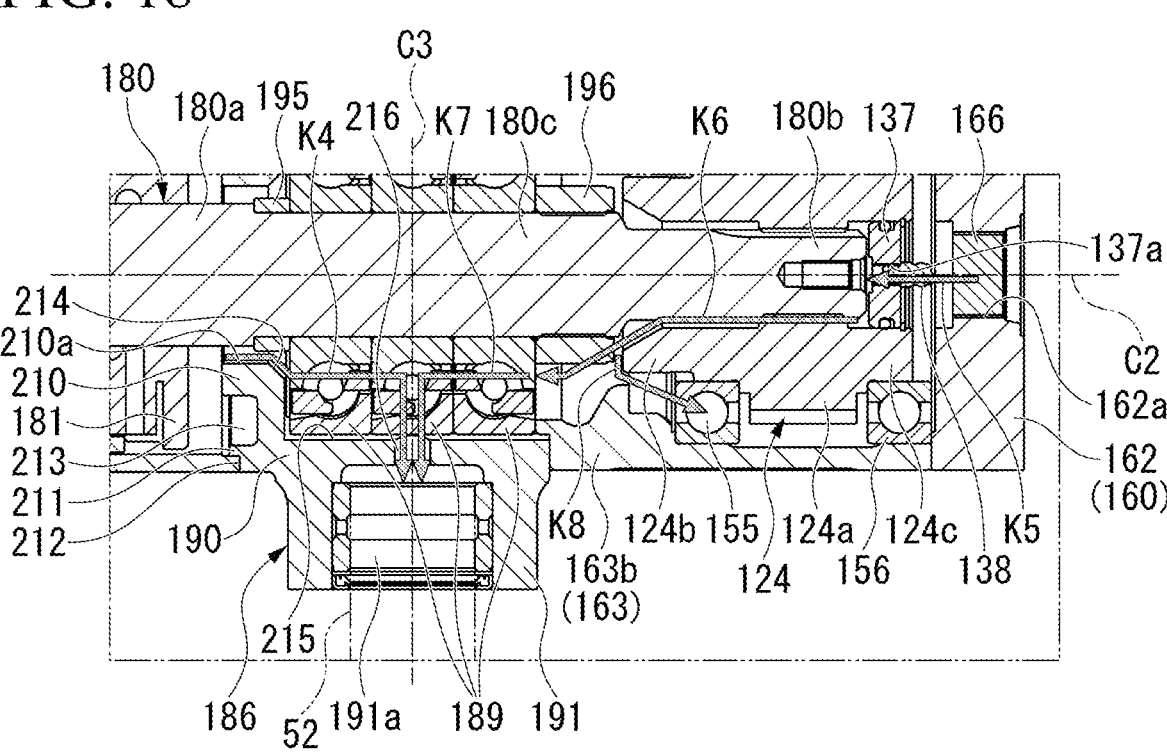
FIG. 18 is a view corresponding to FIG. 11 and is an explanatory view of an example of a flow of the lubricant according to the embodiment.

As illustrated in FIG. 18, thereafter, the lubricant flows in an arrow K4 direction through gaps between the bearings 189 inside the holder 186 and enters the inside of the trunnion portions 191 through the opening holes 216 of the holder 186. Accordingly, the inner circumferences of the trunnion portions 191 can be lubricated, and the pin inserted into the connection holes 191a of the trunnion portions 191 (in the example of the diagram, the pin 52 inserted through the first cylinder base end side hole 21a of the boom 20 illustrated in FIG. 2) can be lubricated.

Next, an example of a flow of a lubricant when the lubricant is supplied from the second supply opening 162a after the electric cylinder 100 is assembled will be described.

As illustrated in FIG. 18, first, the second lid member 166 is removed from the cover unit 160, and the second supply opening 162a is opened. Consequently, the grease nipple 138 is exposed through the second supply opening 162a. Next, the grease nipple 138 is opened by connecting a grease gun or the like to the grease nipple 138 and applying a pressure thereto, for example, and a lubricant is supplied (in the diagram, an arrow K5 direction) to the inner circumferential side (gap) of the driven gear 124 through the supply hole 137a. Consequently, the lubricant flows in an arrow K6 direction along the outer circumference of the spline shaft 180b (gap between splines) of the shaft 180 and enters the inner circumferential side (gap) of the holder 186. Accordingly, the bearings 189 inside the holder 186 can be lubricated.

Thereafter, the lubricant flows in an arrow K7 direction through the gaps between the bearings 189 inside the holder 186 and enters the inside of the trunnion portions 191 through the opening holes 216 of the holder 186. Accordingly, the inner circumferences of the trunnion portions 191 can be lubricated, and the pin inserted into the connection holes 191a of the trunnion portions 191 (in the example of the diagram, the pin 52 inserted through the first cylinder base end side hole 21a of the boom 20 illustrated in FIG. 2) can be lubricated.

On the other hand, a portion of the lubricant flowing in the arrow K6 direction along an outer circumference of the spline shaft 180b of the shaft 180 (gap between splines) flows in an arrow K8 direction along an outer circumference of the driven gear 124 and flows toward the bearings 155 and 156 of the driven gear 124. Accordingly, the bearings 155 and 156 of the driven gear 124 can be lubricated.

<Operational Effects>

As described above, the electric cylinder 100 of the present embodiment includes the shaft 180, the bearings 189 that are provided in the outer circumference of the shaft 180, and the holder 186 that surrounds the shaft 180 with the bearings 189 therebetween. The holder 186 includes the holder main body 190 opening in the axial direction of the shaft 180 and supporting the shaft 180 with the bearings 189 therebetween, and the trunnion portions 191 having a cylindrical shape protruding outward in the radial direction from the holder main body 190. The holder 186 is constituted so as to allow a lubricant to circulate therein from a side outward in the axial direction of the holder main body 190 toward the inner circumferences of the trunnion portions 191.

According to this constitution, a lubricant can circulate inside the holder 186 through the inner circumference of the holder main body 190 opening in the axial direction of the shaft 180, and the lubricant can flow into the trunnion portions 191. When the electric cylinder 100 is turnably connected to the work apparatus 3, a pin is inserted into the trunnion portions 191. In this case, the lubricant is interposed into the gaps between the trunnion portions 191 and the pin. Therefore, the connection portion of the electric cylinder 100 can be efficiently lubricated.

In the present embodiment, the holder 186 includes the protruding cylinder body 210 protruding outward in the axial direction from the holder main body 190 and formed to have a cylindrical shape which is coaxial with the shaft 180. The inner circumferential surface 210a of the protruding cylinder body 210 is separated to the outward side in the radial direction from the shaft 180 throughout the outer circumference of the shaft 180.

According to this constitution, a lubricant can circulate inside the holder 186 through the inner circumference of the protruding cylinder body 210 (the gap between the inner circumferential surface 210a of the protruding cylinder body 210 and the outer circumference of the shaft 180), and the lubricant can flow into the trunnion portions 191. Furthermore, since a portion of the lubricant flows toward the bearings 189 inside the holder 186 by causing the lubricant to circulate along the inner circumference of the protruding cylinder body 210, the bearings 189 can be efficiently lubricated.

In the present embodiment, the holder 186 has the annularly recessed portion 213 opening outward in the axial direction to be able to store a lubricant and formed to have an annular shape along the outer circumference of the protruding cylinder body 210. According to this constitution, a portion of the lubricant flowing from a side outward in the axial direction of the holder main body 190 toward the protruding cylinder body 210 can be stored inside the annularly recessed portion 213. Therefore, an excessive amount of a lubricant flowing into the holder 186 from a side outward in the axial direction of the holder main body 190 toward the protruding cylinder body 210 through the inner circumference of the protruding cylinder body 210 can be curbed.

In the present embodiment, the protruding cylinder body 210 has the outer guide grooves 210b extending from the outward side of the annularly recessed portion 213 in the axial direction toward the inner circumference of the protruding cylinder body 210 and recessed so as to allow a lubricant to circulate therein.

According to this constitution, a lubricant which could not enter the inside of the annularly recessed portion 213 can flow toward the inner circumference of the protruding cylinder body 210 through the outer guide grooves 210b. Therefore, the lubricant flowing from a side outward in the axial direction of the holder main body 190 toward the protruding cylinder body 210 can flow into the holder 186 in stages through the inner circumference of the protruding cylinder body 210.

In the present embodiment, the holder 186 has the inclined surface 214 which is inclined in a manner of being positioned on the outward side in the radial direction toward the inward side in the axial direction from the inner end portion of the inner circumferential surface 210a of the protruding cylinder body 210 in the axial direction.

According to this constitution, since a portion of a lubricant flows toward the bearings 189 inside the holder 186 along the inner circumferential surface 210a of the protruding cylinder body 210 and the inclined surface 214 by causing the lubricant to circulate along the inner circumference of the protruding cylinder body 210, the bearings 189 can be efficiently lubricated. Furthermore, since a portion of a lubricant flows into the trunnion portions 191 through the bearings 189 inside the holder 186 along the inner circumferential surface 210a of the protruding cylinder body 210 and the inclined surface 214, the inside of the trunnion portions 191 can be efficiently lubricated.

In the present embodiment, the holder 186 has the inner guide grooves 215 extending throughout a part in the axial direction of the inner circumferential surface 190a of the holder main body 190 and recessed so as to allow a lubricant to circulate therein, and the opening holes 216 opening outward in the radial direction from the inner guide grooves 215 at the centers of the trunnion portions 191 in the radial direction. According to this constitution, since a portion of a lubricant flows toward the inner circumferential surface 190a of the holder main body 190 and flows into the trunnion portions 191 through the inner guide grooves 215 and the opening holes 216 by causing the lubricant to circulate along the inner circumference of the protruding cylinder body 210, the inside of the trunnion portions 191 can be efficiently lubricated.

In the present embodiment, the electric cylinder 100 includes the nut 181 that is screwed to the screw shaft 180a of the shaft 180, the piston 182 that is joined to the nut 181, the cylindrical piston rod 183 that is joined to the piston 182, and the cylindrical cylinder tube 185 that accommodates the piston rod 183. The piston 182 is constituted so as to allow a lubricant to circulate therein from a position facing the outer circumference of the screw shaft 180a toward the inner circumference of the cylinder tube 185.

According to this constitution, regarding a lubricant, the lubricant can be interposed into the gap of the screw shaft 180a on the outer circumferential side, the gap of the cylinder tube 185 on the inner circumferential side, the gap between a part facing the outer circumference of the screw shaft 180a in the piston 182 and the inner circumference of the cylinder tube 185, and the like. Therefore, each of the portions including the piston 182 can be efficiently lubricated.

In the present embodiment, the piston 182 has the first guide holes 230a extending from a position facing the outer circumference of the screw shaft 180a toward the inner circumference of the cylinder tube 185, opening so as to allow a lubricant to circulate therein, and leading to the head side space 201 formed between the piston rod 183 and the cylinder tube 185.

According to this constitution, a lubricant can flow into the head side space 201 through the first guide holes 230a. Therefore, each of the portions can be efficiently lubricated by the lubricant which has flowed into the head side space 201.

In the present embodiment, the piston 182 is joined to the nut 181 using the bolt 198 extending in the axial direction. The piston 182 has the second guide hole 230b and the third guide hole 230c disposed away from each other in the axial direction and opening so as to allow the lubricant to circulate therein. The second guide hole 230b extends from a position facing the outer circumference of the bolt 198 toward the inner circumference of the cylinder tube 185 and leading to the head side space 201. The third guide hole 230c extends from a position facing the outer circumference of the bolt 198 toward the inner circumference of the cylinder tube 185 and leading to the bottom side space 202 formed between the piston 182 and the holder 186.

According to this constitution, since a lubricant can flow into the head side space 201 through the second guide hole 230b, each of the portions can be efficiently lubricated by the lubricant which has flowed into the head side space 201. Furthermore, since a lubricant can flow into the bottom side space 202 through the third guide hole 230c, each of the portions can be efficiently lubricated by the lubricant which has flowed into the bottom side space 202. Furthermore, if the head side space 201 contracts when the cylinder main body 103 extends, a lubricant and air which could not enter the inside of the head side space 201 enter the outer circumferential side (gap) of the screw shaft 180a through the first guide holes 230a and enter the inside of the bottom side space 202 through the second guide hole 230b, the outer circumference of the bolt 198, and the third guide hole 230c. Therefore, it is possible to curb application of an unintended load to the cylinder main body 103 due to compression or expansion occurring in a lubricant and air enclosed inside the cylinder main body 103.

In the present embodiment, a first end portion side of the shaft 180 in the axial direction is coupled to the driven gear 124 using a spline. The electric cylinder 100 includes the cover member 137 that has the supply hole 137a opening so as to allow a lubricant to be supplied to the first end portion side of the shaft 180 in the axial direction from the outside and covers the first end portion side of the shaft 180 in the axial direction from a side outward in the axial direction, and the grease nipple 138 that is provided in the cover member 137 and is capable of being opened and closed so as to allow a lubricant to be supplied to the supply hole 137a from the outside.

According to this constitution, after the electric cylinder 100 is assembled, the grease nipple 138 can be opened, and the connection portion of the electric cylinder 100 can be lubricated through the supply hole 135a from the outside.

For example, a lubricant can be supplied by the following procedure. First, the grease nipple 138 is exposed to the outside. Next, the grease nipple 138 is opened by connecting a grease gun or the like to the grease nipple 138 and applying a pressure thereto, for example, and a lubricant is supplied to the inner circumferential side (gap) of the driven gear 124 through the supply hole 137a. Consequently, the lubricant enters the inner circumferential side (gap) of the holder 186 along the outer circumference of the spline shaft 180b of the shaft 180 (gap between splines). Thereafter, the lubricant enters the inside of the trunnion portions 191 through the gaps between the bearings 189 inside the holder 186 and the opening holes 216 of the holder 186. Accordingly, the inner circumferences of the trunnion portions 191 can be lubricated, and the pin inserted into the connection holes 191a of the trunnion portions 191 can be lubricated (the connection portion of the electric cylinder is lubricated).

In the present embodiment, the excavator 1 includes the vehicle main body 2 and the work apparatus 3 joined to the vehicle main body 2. The work apparatus 3 includes the foregoing electric cylinder 100.

For this reason, it is possible to provide the excavator 1 in which the connection portion of the electric cylinder 100 can be efficiently lubricated.

In the present embodiment, the work apparatus 3 includes common electric cylinders 100 as the first electric cylinder 100A, the second electric cylinder 100B, and the third electric cylinder 100C.

For this reason, compared to a case of including electric cylinders different from each other as the first electric cylinder 100A, the second electric cylinder 100B, and the third electric cylinder 100C, the number of components can be reduced and cost reduction can be achieved.

Other Embodiments

In the embodiment described above, an example in which the trunnion portions are formed to have a cylindrical shape protruding outward in the radial direction from the holder main body has been described, but it is not limited thereto. For example, the trunnion portions may be formed to have a cylindrical shape protruding outward in a manner of obliquely intersecting the axial direction from the holder main body. For example, the trunnion portions need only be formed to have a cylindrical shape protruding outward in a manner of intersecting the axial direction from the holder main body. For example, the form of the trunnion portions can be changed in accordance with required specifications.

In the embodiment described above, an example in which the holder includes the protruding cylinder body protruding outward in the axial direction from the holder main body and formed to have a cylindrical shape which is coaxial with the shaft has been described, but it is not limited thereto. For example, the protruding cylinder body may not protrude outward in the axial direction from the holder main body. For example, the protruding cylinder body may protrude inward in the axial direction from the holder main body. For example, the holder may not include the protruding cylinder body described above. For example, the protruding cylinder body may be provided in a member different from the holder. For example, the form of the protruding cylinder body can be changed in accordance with required specifications.

In the embodiment described above, an example in which the holder has the annularly recessed portion opening outward in the axial direction such that a lubricant can be stored therein and formed to have an annular shape along the outer circumference of the protruding cylinder body has been described, but it is not limited thereto. For example, the holder may not have the annularly recessed portion. For example, the annularly recessed portion may be provided in a member different from the holder. For example, the form of the annularly recessed portion can be changed in accordance with required specifications.

In the embodiment described above, an example in which the protruding cylinder body has the outer guide grooves extending from the outward side of the annularly recessed portion in the axial direction toward the inner circumference of the protruding cylinder body and recessed so as to allow a lubricant to circulate therein has been described, but it is not limited thereto. For example, the protruding cylinder body may not have the outer guide grooves. For example, the outer guide grooves may be provided in a member different from the protruding cylinder body. For example, the form of the outer guide grooves can be changed in accordance with required specifications.

In the embodiment described above, an example in which the holder has the inclined surface inclined in a manner of being positioned on the outward side in the radial direction toward the inward side in the axial direction from the inner end portion of the inner circumferential surface of the protruding cylinder body in the axial direction has been described, but it is not limited thereto. For example, the inclined surface may not be inclined in a manner of being positioned on the outward side in the radial direction toward the inward side in the axial direction from the inner end portion of the inner circumferential surface of the protruding cylinder body in the axial direction. For example, the inclined surface may be inclined in a manner of being positioned on the inward side in the radial direction toward the inward side in the axial direction from the inner end portion of the inner circumferential surface of the protruding cylinder body in the axial direction. For example, the holder may not have the inclined surface described above. For example, the form of the inclined surface can be changed in accordance with required specifications.

In the embodiment described above, an example in which the holder has the inner guide grooves extending throughout the inner circumferential surface of the holder main body in the axial direction and recessed so as to allow a lubricant to circulate therein, and the opening holes opening outward in the radial direction from the inner guide grooves at the centers of the trunnion portions in the radial direction has been described, but it is not limited thereto. For example, the holder may not have the inner guide grooves. For example, the opening holes may open outward in the radial direction on the outward side of the trunnion portions in the radial direction from the inner circumferential surface of the holder main body. For example, the opening holes may open outward in a manner of obliquely intersecting the axial direction from the inner circumferential surface of the holder main body. For example, the form of the inner guide grooves and the form of the opening holes can be changed in accordance with required specifications.

In the embodiment described above, an example in which the electric cylinder includes the nut that is screwed to the screw shaft of the shaft, the piston that is joined to the nut, the cylindrical piston rod that is joined to the piston, and the cylindrical cylinder tube that accommodates the piston rod; and the piston is constituted so as to allow a lubricant to circulate therein from a position facing the outer circumference of the screw shaft toward the inner circumference of the cylinder tube has been described, but it is not limited thereto. For example, the piston may not be constituted so as to allow a lubricant to circulate therein from a position facing the outer circumference of the screw shaft toward the inner circumference of the cylinder tube. For example, a member different from the piston such as a nut may be constituted so as to allow a lubricant to circulate therein from a position facing the outer circumference of the screw shaft toward the inner circumference of the cylinder tube. For example, the circulation form of a lubricant can be changed in accordance with required specifications.

In the embodiment described above, an example in which the piston has the first guide hole extending from a position facing the outer circumference of the screw shaft toward the inner circumference of the cylinder tube, opening so as to allow a lubricant to circulate therein, and leading to the head side space formed between the piston rod and the cylinder tube has been described, but it is not limited thereto. For example, the piston may not have the first guide hole. For example, the first guide hole may be formed in a member different from the piston. For example, the form of the first guide hole can be changed in accordance with required specifications.

In the present embodiment described above, an example in which the piston is joined to the nut using the bolt extending in the axial direction, the piston has the second guide hole and the third guide hole disposed away from each other in the axial direction and opening so as to allow a lubricant to circulate therein, the second guide hole extends from a position facing the outer circumference of the bolt toward the inner circumference of the cylinder tube leading to the head side space, and the third guide hole extends from a position facing the outer circumference of the bolt toward the inner circumference of the cylinder tube and leading to the bottom side space formed between the piston and the holder has been described, but it is not limited thereto. For example, the piston may not have the second guide hole and the third guide hole. For example, at least one of the second guide hole and the third guide hole may be formed in a member different from the piston. For example, the form of the second guide hole and the form of the third guide hole can be changed in accordance with required specifications.

In the embodiment described above, an example in which a first end portion side of the shaft in the axial direction is coupled to the driven gear using a spline; and the electric cylinder includes the cover member that has the supply hole opening so as to allow a lubricant to be supplied to the first end portion side of the shaft in the axial direction from the outside and covers the first end portion side of the shaft in the axial direction from a side outward in the axial direction, and the grease nipple that is provided in the cover member and is capable of being opened and closed so as to allow a lubricant to be supplied to the supply hole from the outside has been described, but it is not limited thereto. For example, the electric cylinder may not include the cover member and the grease nipple. For example, the first end portion side of the shaft in the axial direction may be covered by the driven gear. For example, the supply hole may be provided in a member other than the cover member, such as a driven gear. For example, the grease nipple may be provided in a member other than the cover member, such as a driven gear. For example, the installation form of the supply hole and the installation form of the grease nipple can be changed in accordance with required specifications.

In the embodiment described above, an example in which the work apparatus includes common electric cylinders as the first electric cylinder, the second electric cylinder, and the third electric cylinder has been described, but it is not limited thereto.

For example, the work apparatus may include electric cylinders different from each other as the first electric cylinder, the second electric cylinder, and the third electric cylinder. For example, the installation form of the electric cylinder can be changed in accordance with required specifications.

In the embodiment described above, an excavator has been described as an example of a work machine (work vehicle), but it is not limited thereto. For example, the present invention may be applied to other work vehicles such as dump trucks, bulldozers, and wheel loaders.

Hereinabove, an embodiment of the present invention has been described, but the present invention is not limited to these. Addition, omission, replacement, and other changes of the constitution can be made within a range not departing from the gist of the present invention, and the embodiment described above can also be suitably combined.

BRIEF DESCRIPTION OF THE REFERENCE SYMBOLS

1 Excavator (work machine)
2 Vehicle main body
3 Work apparatus
100 Electric cylinder
100A First electric cylinder (electric cylinder)
100B Second electric cylinder (electric cylinder)
100C Third electric cylinder (electric cylinder)

137 Cover member
137a Supply hole
138 Grease nipple
180 Shaft
180a Screw shaft
181 Nut
182 Piston
183 Piston rod
185 Cylinder tube
186 Holder
189 Bearing
190 Holder main body
190a Inner circumferential surface of holder main body
191 Trunnion portion
198 Bolt
201 Head side space (first space)
202 Bottom side space (second space)
210 Protruding cylinder body
210a Inner circumferential surface of protruding cylinder body
210b Outer guide groove
213 Annular recessed portion
214 Inclined surface
215 Inner guide groove
216 Opening hole
230a First guide hole
230b Second guide hole
230c Third guide hole

The invention claimed is:

1. An electric cylinder comprising:
a shaft;
a bearing that is provided in an outer circumference of the shaft; and
a holder that surrounds the shaft with the bearing therebetween,
wherein the holder includes
    a holder main body opening in an axial direction of the shaft and supporting the shaft with the bearing therebetween, and
    a trunnion portion having a cylindrical shape protruding outward in a manner of intersecting the axial direction from the holder main body, and
the holder is constituted so as to allow a lubricant to circulate therein from a side outward in the axial direction of the holder main body toward an inner circumference of the trunnion portion through a gap in the bearing.

2. The electric cylinder according to claim 1,
wherein the holder further includes a protruding cylinder body protruding outward in the axial direction from the holder main body and formed to have a cylindrical shape which is coaxial with the shaft, and
an inner circumferential surface of the protruding cylinder body is separated to an outward side in a radial direction from the shaft throughout the outer circumference of the shaft.

3. The electric cylinder according to claim 2,
wherein the holder further has an annularly recessed portion opening outward in the axial direction to be able to store the lubricant and formed to have an annular shape along an outer circumference of the protruding cylinder body.

4. The electric cylinder according to claim 3,
wherein the protruding cylinder body has an outer guide groove extending from the outward side of the annularly recessed portion in the axial direction toward an inner circumference of the protruding cylinder body and recessed so as to allow the lubricant to circulate therein.

5. The electric cylinder according to claim 2,
wherein the holder has an inclined surface which is inclined in a manner of being positioned on the outward side in the radial direction toward an inward side in the axial direction from an inner end portion of the inner circumferential surface of the protruding cylinder body in the axial direction.

6. The electric cylinder according to claim 2,
wherein the holder has
    an inner guide groove extending throughout a part in the axial direction of an inner circumferential surface of the holder main body and recessed so as to allow the lubricant to circulate therein, and
    an opening hole opening outward in a manner of intersecting the axial direction from the inner guide groove at a center of the trunnion portion in the radial direction.

7. The electric cylinder according to claim 1 further comprising:
a nut that is screwed to a screw shaft of the shaft;
a piston that is joined to the nut;
a cylindrical piston rod that is joined to the piston; and
a cylindrical cylinder tube that accommodates the piston rod,
wherein the piston is constituted so as to allow the lubricant to circulate therein from a position facing an outer circumference of the screw shaft toward an inner circumference of the cylinder tube.

8. The electric cylinder according to claim 7,
wherein the piston has a first guide hole extending from a position facing the outer circumference of the screw shaft toward the inner circumference of the cylinder tube, opening so as to allow the lubricant to circulate therein, and leading to a first space formed between the piston rod and the cylinder tube.

9. The electric cylinder according to claim 8,
wherein the piston is joined to the nut using a bolt extending in the axial direction,
the piston further has a second guide hole and a third guide hole disposed away from each other in the axial direction and opening so as to allow the lubricant to circulate therein,
the second guide hole extends from a position facing an outer circumference of the bolt toward the inner circumference of the cylinder tube and leading to the first space, and
the third guide hole extends from a position facing the outer circumference of the bolt toward the inner circumference of the cylinder tube and leading to a second space formed between the piston and the holder.

10. The electric cylinder according to claim 1,
wherein a first end portion side of the shaft in the axial direction is coupled to a rotor using a spline,
the electric cylinder further comprises:
    a cover member that has a supply hole opening so as to allow the lubricant to be supplied to the first end portion side of the shaft in the axial direction from the outside and covers the first end portion side of the shaft in the axial direction from a side outward in the axial direction, and
    a grease nipple that is provided in the cover member and is capable of being opened and closed so as to allow the lubricant to be supplied to the supply hole from the outside.

11. A work machine comprising:

a vehicle main body; and a work apparatus that is joined to the vehicle main body, wherein the work apparatus includes the electric cylinder according to claim 1.

12. An electric cylinder comprising:

a shaft;

a bearing that is provided in an outer circumference of the shaft; and a holder that surrounds the shaft with the bearing therebetween, wherein the holder includes a holder main body opening in an axial direction of the shaft and supporting the shaft with the bearing therebetween, and a trunnion portion having a cylindrical shape protruding outward in a manner of intersecting the axial direction from the holder main body, and the holder is constituted so as to allow a lubricant to circulate therein from a side outward in the axial direction of the holder main body toward an inner circumference of the trunnion portion, wherein the holder has an inner guide groove extending throughout a part in the axial direction of an inner circumferential surface of the holder main body and recessed so as to allow the lubricant to circulate therein, and an opening hole opening outward in a manner of intersecting the axial direction from the inner guide groove at a center of the trunnion portion in the radial direction, wherein the opening hole opens along a central axis of the trunnion portion, when viewed in the radial direction, the opening hole are disposed at positions overlapping central portions of a plurality of bearings in the axial direction.

* * * * *